United States Patent
Molteni et al.

(10) Patent No.: US 12,000,583 B2
(45) Date of Patent: Jun. 4, 2024

(54) SUN-SKY-IMITATING ILLUMINATION DEVICE

(71) Applicant: CoeLux S.r.l., Lomazzo (IT)

(72) Inventors: Matteo Molteni, Cassina Rizzardi (IT); Paolo Ragazzi, Gorgonzola (IT); Antonio Lotti, Arcisate (IT); Davide Magatti, Capiago Intimiano (IT)

(73) Assignee: CoeLux S.r.l., Lomazzo (IT)

( * ) Notice: Subject to any disclaimer, the term of this patent is extended or adjusted under 35 U.S.C. 154(b) by 0 days.

(21) Appl. No.: 17/442,249

(22) PCT Filed: Mar. 26, 2020

(86) PCT No.: PCT/IB2020/052848
§ 371 (c)(1),
(2) Date: Sep. 23, 2021

(87) PCT Pub. No.: WO2020/201938
PCT Pub. Date: Oct. 8, 2020

(65) Prior Publication Data
US 2022/0357017 A1    Nov. 10, 2022

(30) Foreign Application Priority Data

Mar. 29, 2019   (IT) ................. 102019000004775

(51) Int. Cl.
*F21V 9/02*    (2018.01)
*F21V 3/04*    (2018.01)
(Continued)

(52) U.S. Cl.
CPC ............... *F21V 9/02* (2013.01); *F21V 3/049* (2013.01); *F21V 5/004* (2013.01); *F21V 11/06* (2013.01);
(Continued)

(58) Field of Classification Search
CPC . F21V 9/02; F21V 3/049; F21V 5/004; F21V 11/06; G02B 27/30
See application file for complete search history.

(56) References Cited

U.S. PATENT DOCUMENTS

2015/0184812 A1*  7/2015  Van Bommel .......... F21V 13/14
                                                  362/84
2015/0316232 A1* 11/2015  Di Trapani ............. F21V 5/004
                                                  362/268

FOREIGN PATENT DOCUMENTS

| WO | 2009156347 A1 | 12/2009 |
| WO | 2014075721 A1 | 5/2014 |
| WO | 2018157902 A1 | 9/2018 |

OTHER PUBLICATIONS

Remko Dinkla, European International Searching Authority, International Search Report and Written Opinion, corresponding PCT Application No. PCT/IB2020/052848, dated Jul. 10, 2020, 10 pages total.

* cited by examiner

*Primary Examiner* — Evan P Dzierzynski
*Assistant Examiner* — Nathaniel J Lee
(74) *Attorney, Agent, or Firm* — DiBerardino McGovern IP Group LLC

(57) ABSTRACT

A direct-light generator includes an optical unit positioned downstream of an output surface of a collimated light source and upstream from a first emitting surface with respect to a direct light direction. The optical unit includes a first planar light mixing element characterized by a first response function having a first angular profile with a peak having a first divergence angle, and a second planar light mixing element characterized by a second response function having a second angular profile with a peak having a second divergence angle. The first planar light mixing element at least partially (Continued)

intercepts collimated light exiting the output surface of the collimated light source and defines a unit input surface. The second planar light mixing element is positioned downstream of the unit input surface to at least partially intercept light crossing the unit input surface and to define a unit emitting surface.

31 Claims, 12 Drawing Sheets

(51) Int. Cl.
    *F21V 5/00*          (2018.01)
    *F21V 11/06*        (2006.01)
    *G02B 27/30*        (2006.01)
    *F21Y 105/10*       (2016.01)
    *F21Y 115/10*       (2016.01)

(52) U.S. Cl.
    CPC .......... *G02B 27/30* (2013.01); *F21Y 2105/10* (2016.08); *F21Y 2115/10* (2016.08)

FIG. 12a
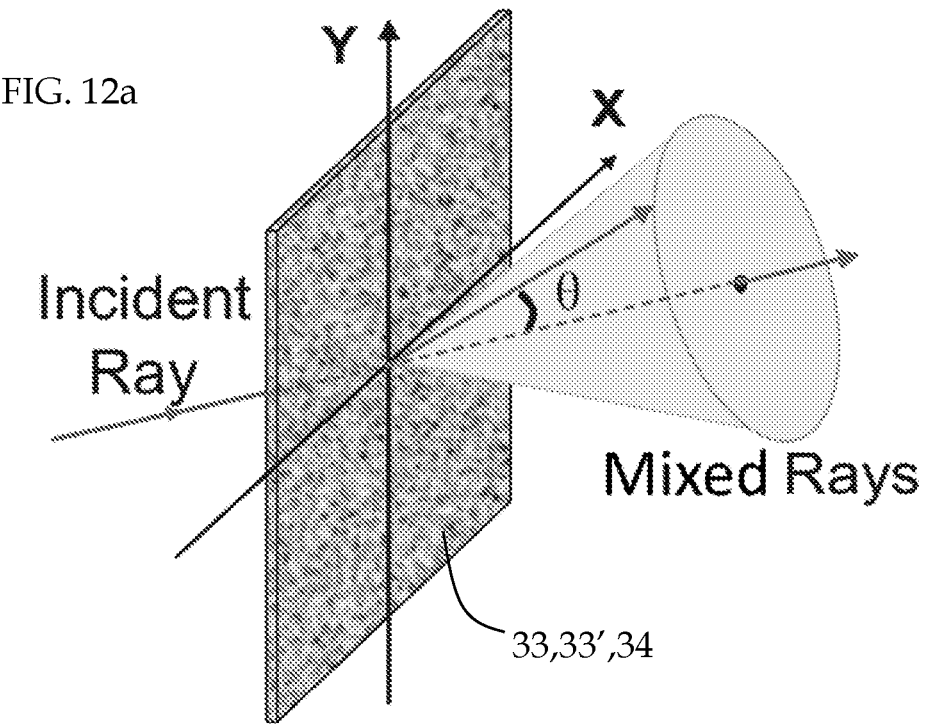
33,33',34
FWHM, α1, α1', α2
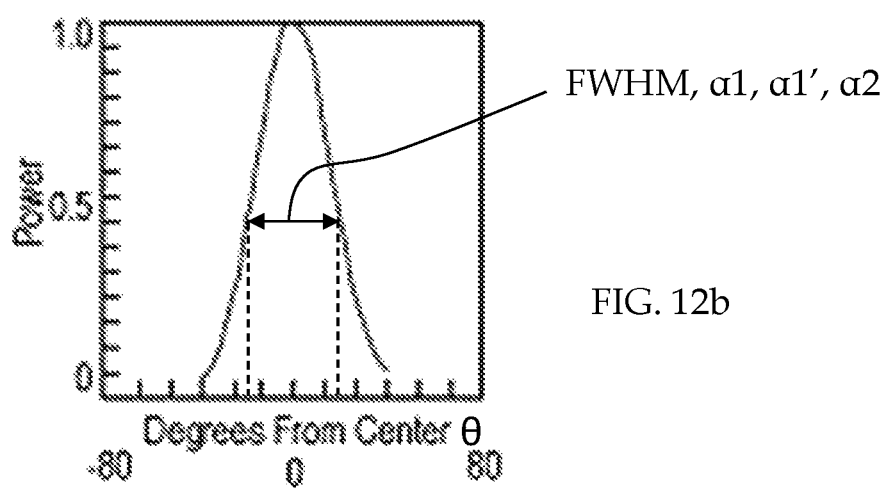
FIG. 12b

SUN-SKY-IMITATING ILLUMINATION DEVICE

TECHNICAL FIELD

The present disclosure generally relates to sun-sky-imitating illumination devices which realize the perception of the natural light from the sun and the sky.

More precisely, the perception of the natural light from the sky and the sun is related both to the capacity of the illumination device to illuminate an ambient with effects very similar to the effects that would manifest in the same room if an aperture with sky and sun beyond it, i.e. a window, would be positioned at the same place, and also to the appearance of the device itself when directly viewing at it, which creates the visual appearance of infinite depth for the sky and infinite position of the sun sources.

Therefore, the aims which the embodiments of the present invention fulfill may be divided into two main categories, related to
the illumination of an ambient by the light emitted by the sun-sky-imitating illumination device;
the visual appearance of the illumination device itself.

BACKGROUND

For the requirement concerning the illumination of an ambient for the perception of natural light from sky and sun, reference can be made to the illumination devices described in WO 2009/156347 A1 submitted by the same Applicant. One of these illumination devices, comprises a broadband, spot like, light source and a Rayleigh scattering panel placed at a certain distance from the source. The panel separates the light rays from the source into a transmitted component with Correlated Color Temperature (CCT) lower than that of the source, and into a diffused component with higher CCT, the difference in CCT being due to the fact that the scattering efficiency increases with the inverse of the fourth power of the wavelength in the addressed Rayleigh regime. As long as the light source is small in comparison to the panel, the direct light is able to cast object shadows, which are bluish under the diffused cold light caused by the panel.

However, the devices described in WO 2009/156347 A1 do not properly satisfy the requirements concerning the visual appearance of the illumination device itself when directly viewing at it. In fact, an observer who sees the source through the panel does not see it at infinity, but at the given spatial position at which the light source is positioned. The divergence of the direct-light rays implies that neither the direction under which the spot of the artificial sun is seen nor the aperture angle (penumbra) is fixed, but they depend on the observer's position and on his/her distance from the source. Such visual cues prevent the observer to naturally interpret the light source as located at infinite distance, i.e. the visual cues prevent the sky and sun scene from being perceived as having infinite depth, the source itself defining the limit depth of the scene.

Patent application WO 2014/075721A1 filed by the same Applicant describes an artificial illumination device which successfully achieves to form shadows that are parallel, sharp and more bluish than the rest of illuminated scene, so as to make an observer experience an infinite visual depth perception of a sky and sun image when he/she directly looks at said artificial illumination device, without inter- and intra-conflicts among visual perception cues. The device of WO 2014/075721A1 makes use of a direct light source capable of generating light with a luminance profile similar to that of the light from the sun, and a diffused-light generator positioned downstream of the direct light source, which is at least partially transparent to the impinging light and is configured to emit a diffused light having a higher CCT than the CCT of the light generated by the direct light source. In detail, the direct light source described in WO 2014/075721A1 is configured to produce, from a primary light, a direct light which exists an emitting surface with a luminance profile Ldirect(x, y, θ, φ) which is uniform (with respect to the spatial dependence) across the emitting surface and has a narrow peak (i.e. with respect to the angular dependence) along a direct light direction, wherein x and y are the transverse coordinates along perpendicular axes x and y spanning the emitting surface, θ is the polar angle measured relative to the direct-light direction, and φ is the azimuthal angle. The term "narrow" is, in general, interpreted as implying that Ldirect(x, y, θ, φ) has a peak subtended by a solid angle which is significantly smaller than $2\pi$ sr, e.g. smaller than 0.4 sr. Owing to the fact that the diffused-light generator is at least partially light-transparent, at least a portion of the direct light propagates downstream of the diffused-light generator. As a consequence, the outer light comprises a first light component which propagates along directions contained within the narrow peak and a second light component which propagates along directions spaced apart from the narrow peak, with the first light component having a CCT which is lower than a CCT of the second light component.

In order to achieve the above identified luminance angular profile constraints, WO 2014/075721A1 describes a direct light source which makes use of a filtering layer positioned downstream of a collimated light source with a substantially uniform dark background. The filtering layer is chosen to be able to transform a collimated beam featured by the presence of stray light that originates from the collimated light source and impinges onto the filtering layer, into a second collimated beam with divergence substantially equal to the divergence of the first collimated beam and which is free from stray light.

In the embodiments described in WO 2014/075721A1 the filtering layer consists of a microstructure comprising two-dimensional arrays of microlenses and microtubes of absorbing material which need to satisfy very high constraints in terms of degree of precision in their geometry and relative positioning in order to correctly transform the first collimated beam into the second collimated light beam by eliminating stray light only. Accordingly, the production of the direct light source which allows to fulfill the above identified luminance angular profile constraints requires very complex production techniques and involves extremely high production costs.

Moreover, the embodiments for the direct-light source provided in WO 2014/075721A1 may still in some cases exhibit minor problems in achieving the required spatial uniformity across the emitting surface.

Accordingly, the present disclosure is directed, at least in part, to improving or overcoming one or more aspects of prior systems and particularly to a solution which is capable of achieving the above identified luminance angular profile constraints by means of a simpler structure which does not require highly complex production processes.

SUMMARY OF THE DISCLOSURE

In a first aspect, the present disclosure is directed to a sun-sky-imitating illumination device for generating natural light similar to that from the sun and the sky, comprising:

a direct-light generator that comprises a first emitting surface from which a direct light is emitted and a collimated light source configured to generate from a primary light a collimated light which exits an output surface positioned upstream from the first emitting surface with respect to a direct light direction, wherein the direct light has a luminance profile Ldirect(x, y, θ, φ) which has a first peak in the angular distribution around the direct-light direction and the collimated light exiting the output surface has a luminance profile Lcoll(x, y, θ, φ) which has a second peak in the angular distribution around the direct-light direction, the second peak being a narrow peak, and a diffused-light generator that is at least partially light-transparent and is positioned downstream of the direct-light generator and comprises a second emitting surface and is configured to cause diffused light at the second emitting surface, wherein the sun-sky-imitating illumination device is configured such that the direct-light generator and the diffused-light generator co-operate to form outer light at the second emitting surface which comprises a first light component which propagates along directions contained within the narrow peak and a second light component which propagates along directions spaced apart from the narrow peak, wherein the first light component has a CCT which is lower than a CCT of the second light component, characterized in that the direct-light generator comprises an optical unit positioned downstream of the output surface of the collimated light source and upstream from the first emitting surface with respect to the direct light direction, wherein the optical unit is configured to interact with the collimated light exiting the output surface to generate the direct light emitted from the first emitting surface so that the first peak of the luminance profile Ldirect(x, y, θ, φ) of the direct light is larger than the second peak of the luminance profile Lcoll(x, y, θ, φ) of the collimated light, the optical unit comprising a first planar light mixing element characterized by a first response function having a first angular profile with a peak having a first divergence angle $\alpha_1$, $\alpha_{1'}$ measured as full width at half maximum (FWHM) of the peak, the first planar light mixing element being positioned so as to at least partially intercept the collimated light exiting the output surface of the collimated light source and to define a unit input surface, and a second planar light mixing element characterized by a second response function having a second angular profile with a peak having a second divergence angle $\alpha_2$ measured as full width at half maximum (FWHM) of the peak, the second planar light mixing element being positioned downstream of the unit input surface so as to at least partially intercept the light crossing the unit input surface and to define a unit emitting surface, wherein the first and second divergence angles of the response functions of the first and second planar light mixing elements are equal to or smaller than 40° preferably smaller than 30°, more preferably smaller than 20°, and wherein the first and second planar light mixing elements are spaced apart from each other at least of a minimum unit depth z1 measured along the direct light direction, configured to obtain uniform luminance of the direct light which exits the first emitting surface of the direct light generator.

Within the scope of the present description and appended claims, the term "narrow peak" is interpreted as saying that the luminance profile L (x, y, θ, φ) of the light has a peak subtended by a solid angle which is significantly smaller than $2\pi$ sr, e.g. smaller than 0.4 sr, preferably smaller than 0.3 sr, more preferably smaller than 0.2 sr. In other words, a narrow peak is characterized by a polar angle profile, averaged over all azimuthal angles, with a HWHM (half width at half maximum) significantly smaller than 45°, e.g. smaller than 20°, preferably smaller than 15°, more preferably smaller than 10°.

Within the scope of the present description and appended claims, the term "response function of the light mixing element" refers to the response—in terms of angular aperture of the luminous intensity distribution of the exiting rays given by the light mixing element—to a collimated light beam incident on the same along an incident direction. In detail, in case the light mixing element is characterized by a radially symmetric response function, it can be plotted as output luminous intensity with respect to the polar coordinate θ relative to the incident direction. This is also known as "angular profile" of the response function and is schematized by way of an example in FIGS. 12a and 12b. The light mixing elements used in the illumination device of the invention are characterized by an angular profile featuring a peak which defines the angular divergence α of the light mixing element response function. In case the light mixing element is not characterized by a radially symmetric response function, within the scope of the present description and appended claims reference is made to the angular profile along polar coordinate θ showing the largest peak, namely taken at the azimuthal coordinate $\varphi_0$ which maximizes the angular divergence α along θ.

The Applicant realized that in order to achieve the above discussed luminance angular profile constraints, it is necessary to achieve both, a uniform illuminance profile projected onto the diffuser by the collimated light source and a luminance profile at the second emitting surface substantially free of spatial modulations (e.g. due to structural irregularities in the background).

The Applicant recognized that spatial non-uniformities in the illuminance profile on the diffuser emitting surface would be visible at the said surface so that an observer would recognize the distance between the direct light generator (sun) and the diffused light generator (sky), e.g. by focusing on the spatial non-uniformities visible at the diffuser emitting surface. In order to improve uniformity, Applicant recognized the need of a first light mixing element positioned away from the diffuser emitting surface of a propagation distance which is at least equal to the unit depth.

Moreover, Applicant identified that uniformity in the luminance profile at the second emitting surface could be assured by positioning the second planar light mixing element spaced apart from the unit input surface where the luminance spatial modulations occur. This causes each localized modulation in the luminance profile at the unit input surface (i.e. at the output surface of the collimated light source) to lead to a sufficiently large and so sufficiently weak blurred modulation in the luminance profile at the unit emitting surface (i.e. at the first emitting surface) where the second light mixing element is positioned, with the unit emitting surface being spaced apart from the unit input surface of at least the unit depth.

Accordingly, the combined use of a first and a second planar light mixing elements spaced apart from each other of a propagation distance (i.e. the unit depth) sufficient to obtain uniform luminance of the direct light which exits the first emitting surface of the direct light generator, assures both to hide possible spatial modulations occurring at the unit input surface to the observer and to improve uniformity of the illuminance profile of the projected light.

Within the scope of the present description and appended claims, the term "uniform luminance" is interpreted as saying that the luminance profile L (x, y, θ, φ) of the light shows minimal spatial amplitude fluctuations for polar angle θ greater than 2 $\theta_{HWHM}$, where $\theta_{HWHM}$ is the HWHM of the polar angle profile, averaged over all azimuthal angles, of the luminance profile itself; e.g. the ratio between a standard deviation of said luminance spatial fluctuations and the luminance average value may not exceed the value of 0.3, preferably not exceed the value of 0.1, within any 10 mm diameter spatial circular areas and for at least 90% of the light-emitting surface, and may not exceed the value of 0.4, preferably not exceed the value of 0.3, more preferably not exceed the value of 0.2, within the entire at least 90% of the light-emitting surface, for any fixed azimuthal angle φ and for any fixed polar angle θ greater than 2 $\theta_{HWHM}$.

Additionally, the term "uniform luminance" is also interpreted as saying that, for polar angle θ smaller than $\theta_{HWHM}$, the luminance profile L (x, y, θ, φ) of the light does not exhibit fluctuations in a (local) polar angle leading to (local) maximum luminance with standard deviation larger than 0.5 $\theta_{HWHM}$ by varying spatial coordinates within areas of 5 cm diameter, preferably 10 cm diameter, more preferably 20 cm diameter, and does not exhibit fluctuations in the (local) polar angle leading to (local) maximum luminance with standard deviation larger than $\theta_{HWH}$ by varying spatial coordinates within the entire at least 90% of the entire light-emitting surface.

The present invention in at least one of the above aspects may have at least one of the following preferred features; the latter may in particular be combined with each other as desired to meet specific implementation purposes.

According to a variant of the invention, the minimum unit depth z1 is comprised between 1 cm≤z1≤50 cm, preferably 2.5 cm≤z1≤40 cm, more preferably 5 cm≤z1≤30 cm, even more preferably between 10 cm≤z1≤15 cm.

Based on extensive experimental tests and simulations, the Applicant has identified that spatial modulations which may characterize the luminance profile of the collimated light may be corrected by positioning the first and the second planar light mixing elements spaced apart of a distance comprised within the above ranges. This results to be the best tradeoff between the achievable illumination effect (appearance and projection), and the size and simplicity of the device structure.

According to a variant of the invention, the minimum unit depth z1 is configured so that the first peak of the luminance profile Ldirect(x, y, θ, φ) of the direct light is larger than the second peak of the luminance profile Lcoll(x, y, θ, φ) of the collimated light.

According to a variant of the invention, at least one between the first planar light mixing element and the second planar light mixing element is a low-angle white light diffuser characterized by a response function having an angular profile with a peak having a divergence angle $\alpha_1, \alpha_2$ measured as full width at half maximum (FWHM) of the peak, the low-angle white light diffuse being configured to cause a blurring of the peak in the luminance profile Lcoll (x, y, θ, φ) of the collimated light exiting the output surface, wherein the low-angle white light diffuser optionally comprises at least one of: a random distribution of micro-refractors formed in an outer surface of a transparent layer or bulk material, and a dispersion of transparent microparticles in a transparent layer or bulk material wherein the microparticles and the layer or bulk material experience a refractive-index mismatch.

Preferably, the low-angle white light diffuser of the second planar light mixing element is integrated in the diffused-light generator as dispersion of transparent microparticles or superficial random distribution of micro-refractors formed in at least one of the second emitting surface and a diffuser input surface of the diffused-light generator.

According to a variant of the invention, the first planar light mixing element is a micro-optical light mixer comprising a pair of micro-lens arrays, wherein each micro-lens of a first array of the pair of micro-lens arrays is positioned at a focal distance with respect to a respective micro-lens of a second array of the pair of micro-lens arrays so that the micro-lenses of the second array produce in the far field an image of the respective micro-lens of the first array, wherein the micro-optical light mixer is characterized by an acceptance angle α_acc and a response function to a collimated light pulse transmitted within an acceptance angle α_acc having an angular profile showing a peak with a divergence angle α1' measured as full width at half maximum (FWHM) of the peak.

According to a variant of the invention, the optical unit additionally comprises a bidimensionally extending structure comprising a plurality of side-by-side aligned channels optionally formed by void volumes separated by walls, wherein the walls separating the void volumes of the channels are optionally made of or coated with a light absorbing material having an absorption coefficient for visible light preferably greater than 70%, more preferably 90%, even more preferably 95%.

According to a variant of the invention, the channels are distributed adjacent to each other in a close-packing arrangement.

According to a variant of the invention, the channel structure is positioned downstream of the first light mixing element.

According to a variant of the invention, the optical unit comprises at least one lateral surface extending transversal with respect to the first planar light mixing element and facing towards the inside of the optical unit, wherein the lateral surfaces are coated or made of a material with a reflectance factor η_r>70%, preferably η_r>80%, more preferably η_r>90%.

Preferably, the at least one lateral surface abuts or overlaps the first planar light mixing element or the channel structure at the side facing the second light mixing element along the direct light direction and extends towards the second light mixing element. In detail, according to one variant the at least one lateral surface may abut the first planar light mixing element at its perimeter or more internally with respect to that perimeter. According to another variant, the first planar light mixing element may abut the at least one lateral surface at an upper end thereof or at an intermediate position with respect to the lateral surface extension. According to a further variant, the at least one lateral surface may abut the side of the channel structure facing the second light mixing element at its perimeter or more internally with respect to that perimeter. According to another variant, the side of the channel structure facing the second light mixing element may abut the at least one lateral surface at an upper end thereof or at an intermediate position with respect to the lateral surface extension; in this last case, the at least one lateral surface overlaps the side of the channel structure facing the second light mixing element with respect to the direct light direction.

According to a variant of the invention, the collimated light source comprises an array of light-emitting devices each comprising a light emitter and at least one collimation lens illuminated by the light emitter, the light emitter being housed in a hollow housing which is internally coated or made of light absorbing material having an absorption coefficient for visible light preferably greater than 70%, more preferably 90%, even more preferably 95%, and has at least an aperture where the at least one collimation lens is positioned.

According to a variant of the invention, each light-emitting device further comprises a pre-collimation lens positioned upstream from the collimation lens and substantially in contact or proximal to the light emitter, the pre-collimation lens being configured to emit with a substantially angularly constant intensity within an emission cone, and to uniformly illuminate a whole light input surface of the collimation lens.

According to a variant of the invention, the pre-collimation lens comprises a concave-curved light inlet surface facing the light emitter and a convex-curved light outlet surface, the inlet and the outlet surfaces preferably having an aspheric profile.

According to a variant of the invention in which the pre-collimation lens is characterized by a pre-collimation lens height $b_2$ and a base of the input surface of the collimation lens being spaced apart from a base of the inlet surface of the pre-collimation lens of a lenses distance h, a ratio $b_2/h$ between the pre-collimation lens height $b_2$ and the lenses distance h is comprised in the range of 0.2-0.8, more preferably in the range between 0.25-0.75 and even more preferably in the range between 0.3-0.7. Within the scope of the present description and appended claims, the term "pre-collimation lens height" refers to the distance between the intersection points between a straight line orthogonal to plane comprising the light emitter emitting surface and passing through a center of mass of the pre-collimation lens and (a) the pre-collimation lens inlet surface and (b) the pre-collimation lens outlet surface, respectively.

Within the scope of the present description and appended claims, the term "light emitter emitting surface" refers to the emitting surface of the light emitter facing the pre-collimation lens.

Within the scope of the present description and appended claims, the term "base of the lens input/inlet surface" refers to the nearest parallel plane to the light emitter emitting surface still intersecting at least a point of the lens input/inlet surface.

According to a variant of the invention in which the pre-collimation lens is characterized by a pre-collimation lens maximum width $b_1$ and the collimation lens has a collimation lens maximum width C, a ratio $b_1/C$ between the pre-collimation lens maximum width $b_1$ and the collimation lens maximum width C is comprised in the range of 0.3-0.85, more preferably in the range between 0.35-0.75 and even more preferably in the range between 0.4-0.7.

Within the scope of the present description and appended claims, the term "lens maximum width" refers to the maximum value between a plurality of local width values each referring to a plane which intersect the lens parallel to the light emitter emitting surface, wherein each local width value is defined as the maximum distance between any two points comprised in a section area defined by the intersection of the lens with the corresponding parallel plane.

According to a variant of the invention in which the pre-collimation lens is characterized by a maximum width $b_1$ and a height $b_2$, the collimation lens is characterized by a maximum width C and is spaced apart from the pre-collimation lens of a distance h measured between the base of the light inlet surface of the pre-collimation lens and the base of the light input surface of the collimation lens, both, the ratio between the maximum width C and the distance h, and the ratio between the width $b_1$ and the height $b_2$ range between 0.8-1.6, more preferably between 0.85 and 1.4, even more preferably between 0.90 and 1.3.

According to a variant of the invention in which the pre-collimation lens is characterized by a pre-collimation lens maximum width $b_1$ and the light emitter emitting surface is characterized by a width $a_1$, a ratio $a_1/b_1$ between the width $a_1$ of the light emitter emitting surface and the pre-collimation lens maximum width $b_1$ ranges between 0.2 (1:5) and 0.04 (1:25).

According to a variant of the invention the light emitter emitting surface is spaced apart from the light inlet surface of the pre-collimation lens of a gap d lower than a maximum value comprised between 0.01 and 0.04 times the lenses distance h, preferably 0.015-0.035 times the lenses distance h, even more preferably substantially equal to 0.025 times the lenses distance h.

According to a variant of the invention, the collimated light source further comprises a channel structure positioned downstream of the array of light-emitting devices and upstream from the output surface, the channel structure being configured to transform a first collimated light beam featured by the presence of stray light emitted by the light-emitting devices and that impinges onto the channel structure into a second collimated light substantially free from stray light propagating at an angle higher than a cut angle $\alpha\_cut$.

According to the above description, the several features of each embodiment can be unrestrictedly and independently combined with each other in order to achieve the advantages specifically deriving from a certain combination of the same.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure.

In the drawings:

FIGS. 12a and 12b schematically depict a radially symmetric response function of a light mixing element and its angular profile, respectively.

DETAILED DESCRIPTION

Figure 1:
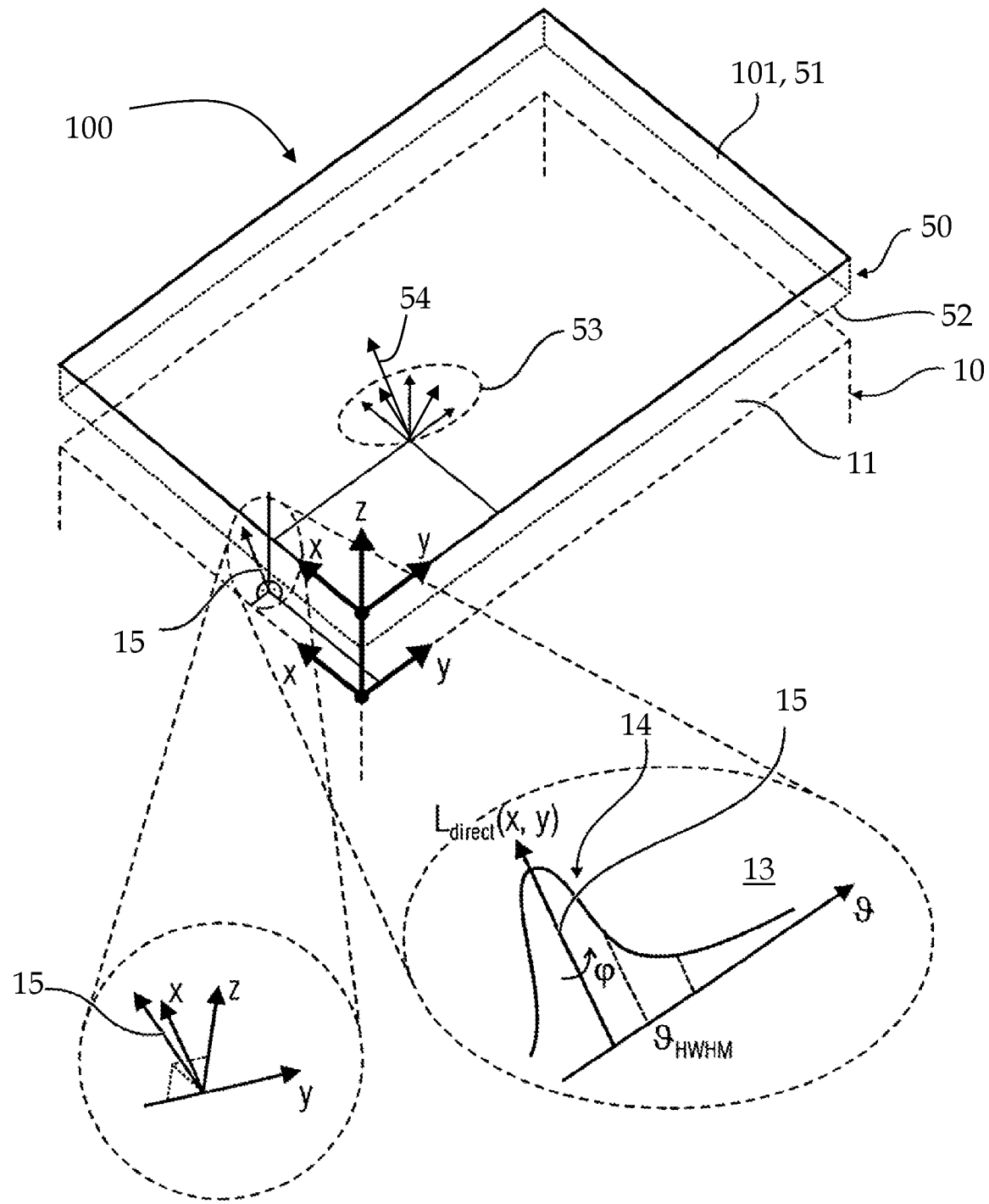
FIG. 1 schematically shows a sun-sky-imitating illumination device according to the invention with additionally schematically showing the luminance profile of the direct light.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

FIG. 1 schematically illustrates a sun-sky-imitating illumination device 100 which is capable of illuminating an ambient as the sun and the sky do through a window, and which guarantees at the same time a visual appearance of the illumination device that offers the experience of virtually infinite depth as the sky and the sun do in nature when they are observed through a window. In other terms, FIG. 1 illustrates a sun-sky-imitating illumination device for generating natural light as the sun and the sky, i.e. having a luminance profile and an appearance similar to that of the light from the sun and the sky.

The sun-sky-imitating illumination device 100 of FIG. 1 comprises a direct-light generator 10. Merely a first emitting surface 11 of the direct-light generator is shown for sake of intelligibility of FIG. 1. However, the direct-light generator 10 comprises one or more light-emitting devices 21 (shown in FIGS. 7, 9 and 10) configured to emit primary light and positioned upstream relative to the light-emitting surface 11, wherein the term "upstream" is defined with respect to the light propagation direction.

The direct-light generator 10 is configured to produce from the primary light a direct light 13 which exits the first emitting surface 11 with a luminance profile Ldirect (x, y, $\theta$, $\varphi$) which is uniform (with respect to the spatial dependence) across the first emitting surface 11 and has a narrow peak 14 with respect to the angular dependence along a direct light direction 15, wherein x and y are the transverse coordinates along perpendicular axes x and y spanning the first emitting surface 11, $\theta$ is the polar angle measured relative to the direct-light direction 15, and $\varphi$ is the azimuthal angle.

Moreover, the sun-sky-imitating illumination device of FIG. 1 also comprises a diffused-light generator 50 positioned downstream of the first emitting surface 11, wherein the term "downstream" is defined to follow the light propagation direction.

The diffused-light generator 50 comprises a second emitting surface 51 (or diffuser emitting surface 51) and a diffuser input surface 52 facing opposite to the diffuser emitting surface, and is configured to be, at least partially, transparent to the light impinging onto the input surface 52. Moreover, the diffused-light generator 50 is configured to emit a diffused light 53 from the second emitting surface 51, wherein said diffused light 53 is the component of the outer light which exits the second emitting surface 51 being scattered in virtually all forward directions and being uniform or at least weakly dependent on the spatial coordinates x,y. For example, the diffused-light generator 50 is configured to emit a diffused light over a solid angle which is at least 4 times larger, preferably 9 times larger, more preferably 16 times larger than the solid angle subtending the narrow peak 14.

In a different embodiment (not shown) the mutual positions of the first emitting surface 11 and the second emitting surface 51 is inverted with respect to the case of FIG. 1. In other words, in the case of FIG. 1, the second emitting surface 51 forms the outer surface 101 of the device 100, whereas in case of inverted positioning, the first emitting surface 11 forms the outer surface 101 of the device 100.

In addition, the sun-sky-imitating illumination device 100 is configured so that the direct light 13 produced by the direct-light generator 10 has a CCT which is lower than a CCT of the diffused light 53 (e.g. at least 1.2 times lower, preferably 1.3 times lower, more preferably 1.4 times lower). Owing to the fact that the diffused-light generator 50 is at least partially light-transparent, at least a portion of the direct light 13 propagates downstream of the second emitting surface 51. As a consequence, the outer light comprises a first direct light component 54 which propagates along directions contained within the narrow peak 14 (for example along at least 90% of the directions subtending the narrow peak 14, i.e. 90% of the directions with polar angle $\theta$ smaller than the HWHM polar angle of the narrow peak) and a second diffused light component 53 which propagates along directions spaced apart from the narrow peak 14, e.g. directions spanning at least 30%, preferably 50%, most preferably 90% of the angular region outside the cone with axis directed along direction 15 and half-aperture 3 times larger than the HWHM polar angle of the narrow peak, wherein the first light component has a CCT which is lower than a CCT of the second light component (e.g. at least 1.2 times lower, preferably 1.3 times lower, more preferably 1.4 times lower).

The above described uniformity condition on the luminance profile of the direct light 13 exiting the direct-light generator 10 results in a uniform illuminance profile at the diffuser input surface 52 and, accordingly, a uniform luminance profile of the direct light component 54 which exits the second emitting surface 51. This allows avoiding visual perception cue conflicts which would lead to a depth perception different from an infinite depth perception for any cue among the accommodation, the binocular-convergence and the motion parallax visual cues. Moreover, the above condition on the narrow peak of the luminance profile of the direct light 13 and, accordingly, of the direct light component 54, plays a key role in the visual appearance of a prevailing infinite depth perception.

Figure 2:
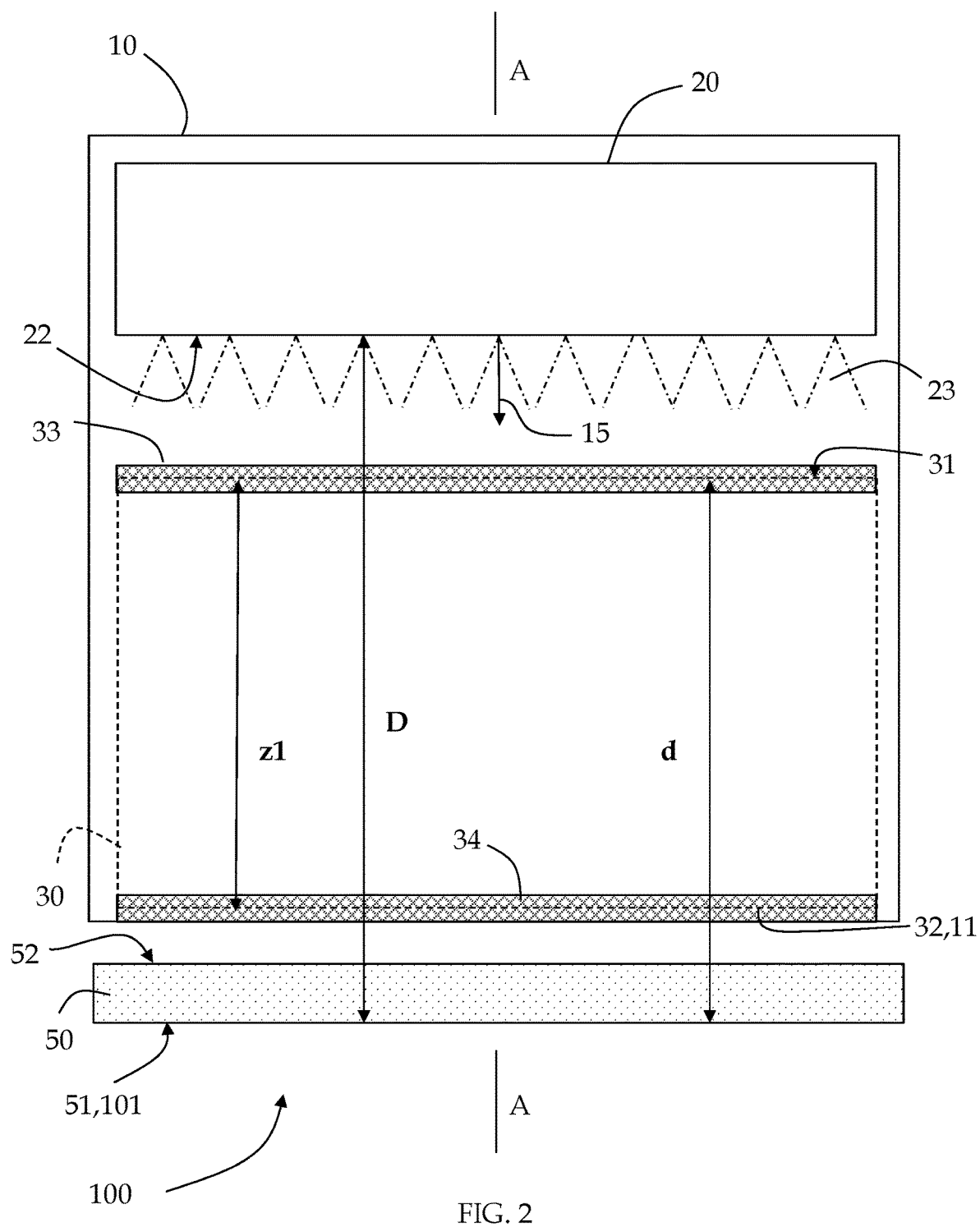
FIG. 2 schematically shows a sectional view of a sun-sky-imitating illumination device according to a first variant of the invention.

As shown in FIG. 2, in a first variant of the invention, the direct-light generator 10 of the sun-sky-imitating illumination device 100 comprises a collimated light source 20 which comprises a plurality of light-emitting devices 21 (shown by way of example in FIGS. 7, 9 and 10) and emits light trough an output surface 22 placed upstream from the first emitting surface 11. The collimated light source 20 is configured to produce a collimated light 23 from the primary light emitted by the light-emitting devices 21, which exits the output surface 22 along the direct light direction 15 with a luminance profile Lcoll (x, y, θ, φ) which has a peak with respect to the angular dependence around the direct light direction 15 which is at least equal to or narrower with respect to the narrow peak 14 of the luminance profile Ldirect (x, y, θ, φ) of the direct light 13 which exits the first emitting surface 11. By way of an example, the luminance profile Lcoll (x, y, θ, φ) has a polar angle profile, averaged over all azimuthal angles, with a peak having HWHM (half width at half maximum) smaller than 15°, preferably smaller than 10°.

With respect to the spatial dependence across the output surface 22, the luminance profile Lcoll (x, y, θ, φ) of the collimated light 23 may be uniform or even slightly non-uniform.

Moreover, the direct-light generator 10 comprises an optical unit 30 positioned downstream of the output surface 22 of the collimated light source 20 with respect to the direct light direction 15. The optical unit is configured to improve the uniformity of the luminance profile Ldirect (x, y, θ, φ) of the direct light 13 which exits the first emitting surface 11, with respect to the uniformity of the luminance profile Lcoll (x, y, θ, φ) of the collimated light 23 exiting the output surface 22.

The optical unit 30 comprises a unit input surface 31 positioned so as to at least partially intercept the collimated light 23 exiting the output surface 22 of the collimated light source 20, and a unit emitting surface 32 positioned downstream of and spaced apart from the unit input surface 31 with respect to the direct light direction 15 so as to at least partially intercept the light crossing the unit input surface 31, namely the collimated light 23 exiting the output surface 22 which has been intercepted by the unit input surface 31, wherein the emitting surface 32 of the optical unit 30 functionally coincides with the first emitting surface 11 of the direct-light generator 10.

In the depicted variants, both, the unit input surface 31 and the unit emitting surface 32 lie on parallel planes perpendicular to the direct light direction 15. However, also other configurations are possible in which the unit input surface 31 and/or the unit emitting surface 32 lie on planes having a normal inclined with respect to the direct light direction 15 with an inclination angle preferably of less than 80°.

With respect to the direct light direction 15, the unit input surface 31 and the unit emitting surface 32 are spaced apart of at least a unit depth z1. In other words, the minimum distance between one point belonging to the unit input surface 31 and one point belonging to unit emitting surface 32 is at least equal to the unit depth z1. In the depicted variants, the unit input surface 31 and the unit emitting surface 32 are parallel so that the unit depth is constant and for all points of the surfaces 31,32 equal to the minimum distance.

The optical unit 30 comprises a first light mixing element 33,33' placed at the input surface 31 and a second light mixing element 34 positioned at the emitting surface 32.

Figure 3:
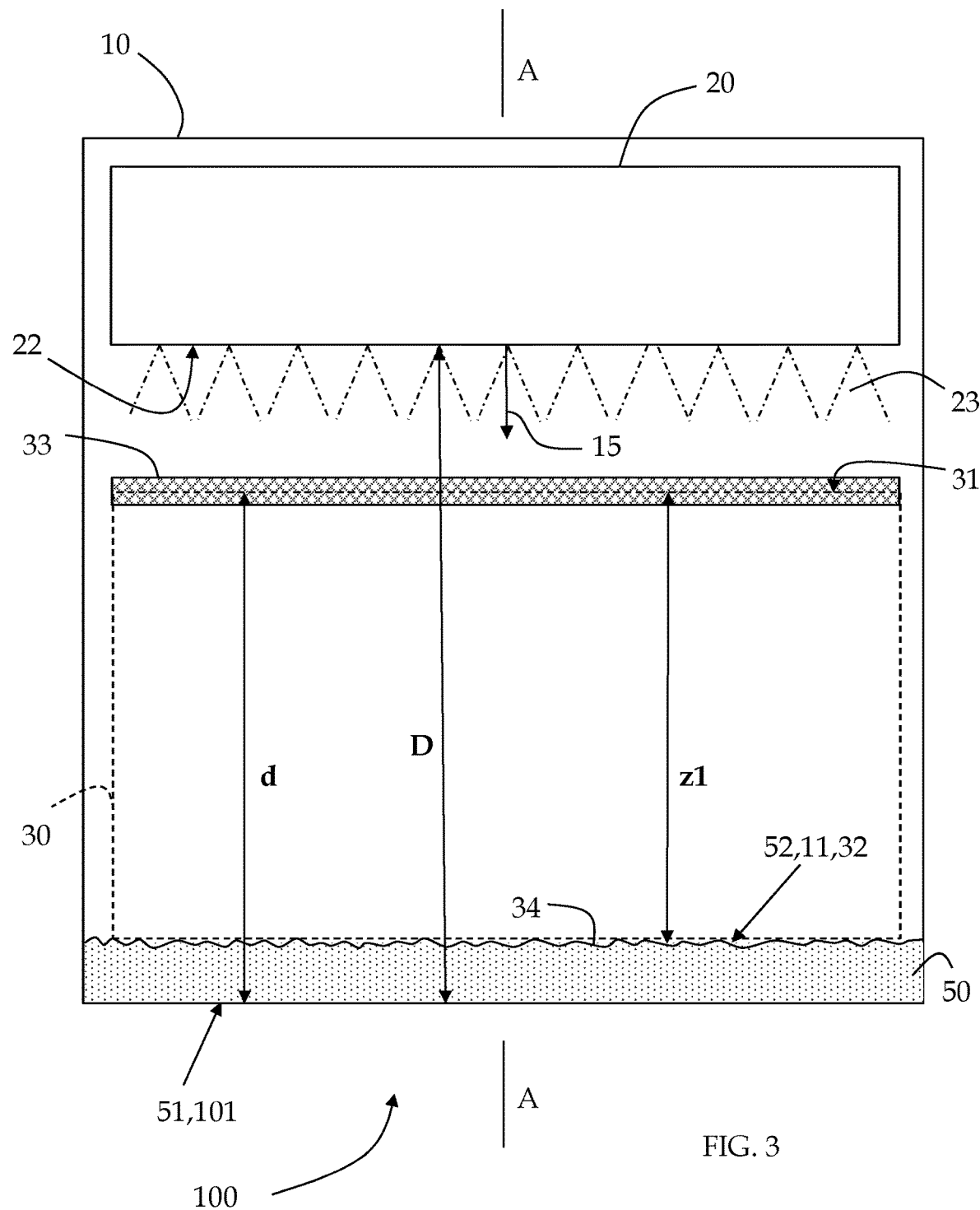
FIG. 3 schematically shows a sectional view of a sun-sky-imitating illumination device according to a second variant of the invention.

In some variants, the first 33,33' and/or the second 34 light mixing elements are solid planar elements characterized by an own thickness (e.g. FIG. 2), whereas in other variants the first 33,33' and/or the second 34 planar light mixing elements are superficial elements (e.g. second light mixing element 34 of FIG. 3). For defining the scope of the present description and the appended claims, the thickness of the solid light mixing elements 33,33',34 is considered neglectable. Accordingly, the positioning of the first 33,33' and/or of the second 34 solid light mixing elements at the unit input surface 31 and/or at the unit emitting surface 32, respectively, is considered as depicted e.g. in FIG. 2, namely with the planar element 33,34 positioned so that its thickness is uniformly distributed across the unit input and/or emitting surface 31,32, respectively. In case of superficial light mixing element, the positioning of the first 33,33' and/or of the second 34 superficial light mixing element at the unit input and/or emitting surface 31,32, respectively, is intended so that the surface bearing the light mixing element is positioned at the unit input or emitting surface 31,32.

The first 33,33' and the second 34 light mixing elements are configured so as to cause a blurring of the peak in the luminance profile both, separately and as result of their combined action. In detail, Accordingly, the peak in the luminance profile Ldirect(x, y, θ, φ) of the light 13 exiting the first emitting surface 11 generally results to be larger than the peak in the luminance profile Lcoll (x, y, θ, φ) of the collimated light 23 exiting the output surface 22. Accordingly, also the minimum unit depth z1 is selected so that the peak of the luminance profile Ldirect(x, y, θ, φ) of the direct light is larger than the peak of the luminance profile Lcoll(x, y, θ, φ) of the collimated light.

In the variants of FIGS. 2 to 4 and 6, both, the first light mixing element 33 and the second light mixing element 34 are a low-angle white-light diffuser, namely a diffuser that operates by performing the convolution of the angular spectrum of the impinging light with a given response function having an angular profile featuring a peak characterized by a divergence angle $\alpha_1, \alpha_2$ measured as FWHM (full width at half maximum) of the peak, equal to or smaller than 40° preferably smaller than 30°, more preferably smaller than 20°. The condition on the divergence angles $\alpha_1, \alpha_2$ respectively of the first 33 and the second 34 light mixing element response functions assures that the luminance profile at the second emitting surface 51 still bears a narrow peak in the angular distribution around the direct-light direction. The response functions of the first 33 and the second 34 light mixing elements are preferably symmetric around a certain direction (e.g. a normal to a surface of the low-angle white-light diffuser).

The low-angle white-light diffuser comprises, for example, a random distribution of micro-refractors, e.g. micro-lenses, micro-voids, micro-prisms, micro-scratches, or a combination of these, formed in an outer surface of a transparent layer material, or a dispersion of transparent microparticles in a transparent bulk where particles and bulk material experience suitable refractive-index mismatch or a combination of a random distribution of micro-refractors and a dispersion of microparticles. That is, in the case of the dispersion of transparent microparticles in a transparent bulk material, a refractive-index mismatch between the transparent microparticles and the transparent bulk material may apply. However, several other embodiments for the white-light diffuser are also possible.

The effect of the first 33 light mixing element is that of improving spatial uniformity in the illuminance profile projected onto the diffuser emitting surface 51. As discussed above, spatial non-uniformities in the illuminance profile on the diffuser emitting surface 51 would be visible at the said surface 51 so that an observer would recognize the distance between the direct light generator (sun) and the diffused light generator (sky), e.g. by focusing on the spatial non-uniformities visible at the diffuser emitting surface 51.

In order to improve uniformity, the first 33 light mixing element is spaced apart from the diffuser emitting surface 51 of a propagation distance d which is at least equal to the unit depth z1. In fact, a possible spatial non-uniformity of the luminance profile Lcoll (x, y, θ, φ) of the collimated light 23 exiting the output surface 22 of the collimated light source 20 leads to an illuminance profile projected onto a surface placed at a projection distance D from the output surface 22 and perpendicular to the direct light direction 15 which, in the absence of the optical unit 30, is also non-uniform across the projection surface. Even if the uniformity degree increases with increasing projection distance D, the high degree of collimation of the collimated light 23 exiting the output surface 22 leads just to a small increase of uniformity for projection distances D in the range of the distance at which the diffused-light generator 50 is usually positioned, i.e. comprised between 0.1 cm-50 cm in sun-sky-imitating illumination devices 100 under consideration, simulating the sun and the sky. Accordingly, in the absence of the optical unit 30, a collimated light 23 having spatially non-uniform luminance profile Lcoll (x, y, θ, φ) generally leads to a non-uniform illuminance profile of the light projected onto the diffuser emitting surface 51. On its turn, this results in a spatially non-uniform luminance profile Ldirect$_2$(x, y, θ, φ) of the direct light component 54 exiting the diffused-light generator 50 at the second emitting surface 51.

In case a low-angle white-light diffuser is used as first 33 light mixing element, the effect is that of inducing a blur in the spatial modulations present in the illuminance profile of the collimated light 23 evolving through optical unit 30 and impinging onto the second emitting surface 51, thereby increasing the uniformity of the projected light. In fact, the effect of the first light mixing element 33 positioned at the unit input surface 31 is that of blurring a point in the illuminance that would be projected onto the second emitting surface 51 in absence of the first light mixing element 33 into a blurred spot having radius approximately equal to the product of the tangent of half the divergence angle $\alpha_1$ characterizing the angular response function of the first light mixing element 33 and the propagation distance d between the unit input surface 31 and the diffuser emitting surface 51.

Thus, considering that the blurring effect depends on the propagation distance d between the unit input surface 31 (where the first light mixing element 33 is positioned) and the diffuser emitting surface 51, and on the divergence angle $\alpha_1$ of the response function characterizing the first light mixing element 33, the propagation distance d at which the diffuser emitting surface 51 is positioned is selected to be at least such that, at the diffuser emitting surface 51, a spatial modulation having width w1 subtends an angle δ which is less than or equal to the divergence angle $\alpha_1$ of the response function of the first light mixing element 33, with the divergence angle $\alpha_1$ measured as FWHM (full width at half maximum) being equal to or smaller than 40°, preferably smaller than 30°, more preferably smaller than 20°.

Based on extensive experimental tests, Applicant identified that the correctable spatial modulations which may characterize the luminance profile of the collimated light 23 exiting the output surface 22 of the collimated light source 20 have a width w1 in the range of 0.5 mm to 30 mm. In fact, the Applicant has identified that in the sub-millimeter range the spatial modulations are barely perceivable by the human eye of an observer positioned at typical distances of 1 m-1.5 m from the sun-sky-imitating illumination device. On the other hand, the Applicant has also recognized that spatial modulations having dimensions above 30 mm cannot be corrected without strongly impairing the overall quality appearance of the sun-sky light components or strongly increasing the overall dimensions of the sun-sky-imitating illumination device.

Accordingly, the Applicant has identified that, for divergence angles $\alpha_1$ of the response function of the first light mixing element 33 characterized by a FWHM (full width at half maximum) equal to or smaller than 40° preferably smaller than 30°, more preferably smaller than 20°, the propagation distance d between the unit input surface 31 and the diffuser emitting surface 51 needs to be comprised between 1 cm≤d≤50 cm. Preferably, the propagation distance d between the unit input surface 31 and the diffuser emitting surface 51 is selected to be 2.5 cm≤d≤40 cm, or better to be comprised between 5 cm≤d≤30 cm, or even better to be comprised between 10 cm≤d≤15 cm. These distance ranges make sure that typical spatial modulations in the illuminance profile of the light impinging onto the second emitting surface 51 appear sufficiently blurred so as to become unnoticeable to the human eye, even in case a first light mixing element 33 having response function with small divergence angle $\alpha_1$ is used. In this way it is possible to obtain at the same time both, an illuminance profile with unnoticeable spatial modulations and a still well-defined appearance of the bright spot simulating the sun due to the small divergence angle $\alpha_1$ of the response function of the first light mixing element 33.

Moreover, Applicant recognized that the spatial modulations in the luminance profile of the collimated light 23 and/or structural irregularities in the background of the direct-light source 10 which are visible at or in proximity (downstream) of the unit input surface 31 may spoil the uniformity of the luminance profile Ldirect of direct light 13 which exits the first emitting surface 11. Accordingly, the possible structures could become visible through the diffused-light generator 50 which is partly transparent, thereby spoiling the uniformity of emission of the second emitting surface 51 and accordingly the infinite depth perception of the observer.

Applicant identified that uniformity in the luminance profile at the second emitting surface 51 could be assured by positioning the second planar light mixing element 34 spaced apart from the unit input surface 31 where the luminance spatial modulations occur. This causes each localized modulation in the luminance profile at the unit input surface 31 to lead to a sufficiently large and so sufficiently weak blurred modulation in the luminance profile at the unit emitting surface 32 (which functionally coincides with the first emitting surface 11) where the second light mixing element 34 is positioned, with the unit emitting surface 32 being spaced apart from the unit input surface 31 of at least the unit depth z1.

By considering that the second light mixing element 34 is a low-angle white-light diffuser with a response function characterized by a divergence angle $\alpha_2$ measured as FWHM (full width at half maximum) being equal to or smaller than 40° preferably smaller than 30°, more preferably smaller than 20° and the typical dimensions of the spatial modulations defined above, also the unit depth z1 needs to be comprised between 1 cm≤z1≤50 cm, preferably 2.5 cm≤z1≤40 cm, more preferably 5 cm≤z1≤30 cm, even more preferably between 10 cm≤z1≤15 cm. This distance ranges assure uniformity of the luminance profile Ldirect of direct light 13 which exits the unit emitting surface 32. Moreover, considering that in the variant of FIG. 2, the propagation distance d is equal to or greater than the unit depth z1, the condition set on the unit depth z1 assures both, uniformity of the illuminance profile on the diffuser emitting surface 51 (given by the constraints on d set out above) and uniformity of luminance at the said surface 51.

Finally, Applicant identified that the transverse extension of the first emitting surface 11 along perpendicular axes x and y is preferably at least equal to z1 and not less than 10 cm.

As shown in FIG. 3, in a second variant according to the invention, the second planar light mixing element 34 is integrated in the diffused-light generator 50. In the variant of FIG. 3, the second planar light mixing element 34 is a low-angle white-light diffuser formed on the input surface 52 of the diffused-light generator 50. In this case, the first emitting surface 11 of the direct-light generator 10 and the unit emitting surface 32 coincide with the diffuser input surface 52. Moreover, the propagation distance d is slightly greater than the unit depth z1 (the propagation distance d is longer for it additionally comprises the diffuser thickness). Accordingly, the distance ranges set on the unit depth z1 and discussed with regard to the variant of FIG. 2, assure both, uniformity of the illuminance profile on the diffuser emitting surface 51 (given by the constraints on d set out above) and uniformity of luminance at the said surface 51, also with respect to the variant of FIG. 3.

Figure 4:
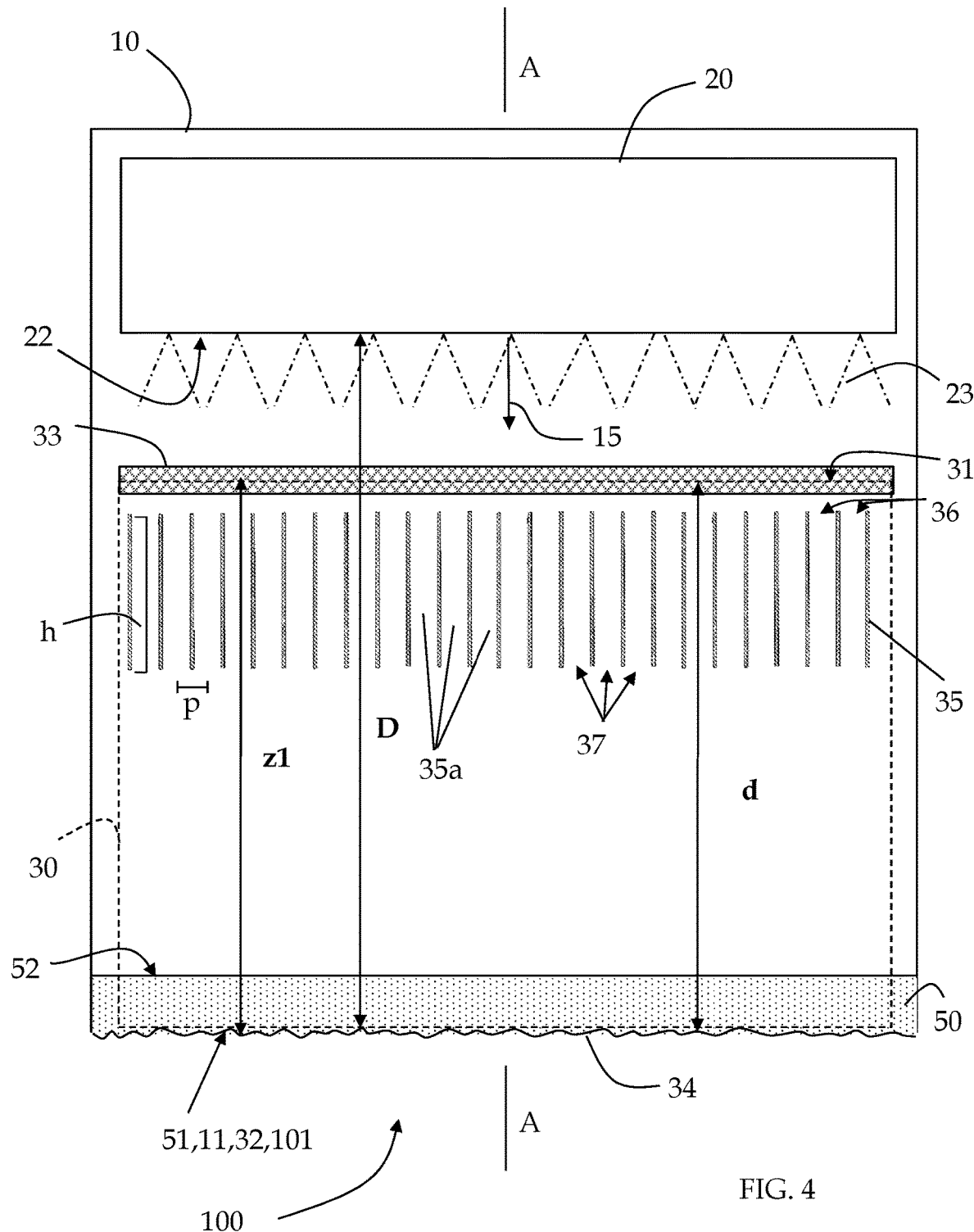
FIG. 4 schematically shows a sectional view of a sun-sky-imitating illumination device according to a third variant of the invention internally provided with a channel structure.

With regard to the variant depicted in FIG. 4, the second planar light mixing element 34 is integrated in the diffused-light generator 50 and, in particular, it is a low-angle white-light diffuser formed in the second emitting surface 51. In this case, the first emitting surface 11 of the direct-light generator 10 and the unit emitting surface 32 coincide with the second emitting surface 51. Moreover, in the variant of FIG. 4, the unit depth z1 coincides with the propagation distance d. Accordingly, the distance ranges set on the unit depth z1 and discussed with regard to the variant of FIG. 2 assure both, uniformity of the illuminance profile on the diffuser emitting surface 51 (given by the constraints on d set out above) and uniformity of luminance at the said surface 51 also with regard to the variant of FIG. 4.

In another (not illustrated) configuration, the low-angle white-light diffuser is implemented as dispersion of transparent microparticles in the bulk material of the diffused-light generator, wherein the bulk material and the dispersed microparticles experience suitable refractive-index mismatch. As in the variant of FIG. 4, in this further variant, the first emitting surface 11 of the direct-light generator 10 and the unit emitting surface 32 coincide with the second emitting surface 51. Moreover, the unit depth z1 coincides with the propagation distance d so that, also in this case, the distance ranges set on the unit depth z1 and discussed with regard to the variant of FIG. 2 assure both, uniformity of the illuminance profile on the diffuser emitting surface 51 (given by the constraints on d set out above) and uniformity of luminance at the said surface 51.

Figure 11:
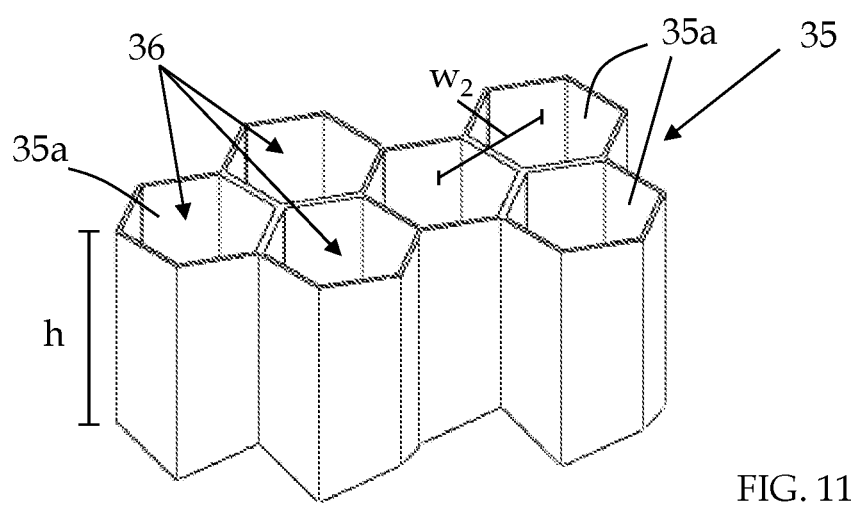
FIG. 11 is a schematic three-dimensional view of the channel structure of FIGS. 4, 5 and 10.

Coming back to the variant of FIG. 4, the optical unit 30 additionally comprises a bi-dimensionally extending structure 35 comprising a plurality of side-by-side aligned channels 35a, which is preferably formed by void volumes separated by walls. The section of each channel 35a may be round, hexagonal or any other polygonal form. In case of hexagonal section, the channels are preferably distributed adjacent to each other so as to form a honeycomb structure as shown in FIG. 11. The walls separating the void volumes of the channels 35a are preferably made of or coated with a light absorbing material having an absorption coefficient η_abs for visible light preferably greater than 70%, more preferably 90%, even more preferably 95%. Each channel has substantially identical cross-sections in any plane parallel to the first emitting surface 11, such cross-sections having their barycenter aligned along the direct-light direction 15. Owing to this geometry, the channel structure 35 thus described is able to absorb light propagating through the same at an angle higher than a cut angle α_cut=a tan($w_2$/h), with w2 being the width of the channels 35a and h being the height of the channels. For example, in case of hexagonal channels, the channel width $w_2$ is equal to double a side of the hexagonal section. Usual cut angles α_cut are preferably smaller than 45°, more preferably smaller than 30°, even more preferably smaller than 20°.

In the variant shown in FIG. 4, the channel structure 35 is positioned downstream of the first light mixing element 33. The channel structure 35 thus positioned is able to transform the collimated light 23 evolved through the first light mixing element 33 which impinges onto said channel structure 35 into a light beam which is free from stray light propagating at an angle higher than the cut angle α_cut.

Figure 5:
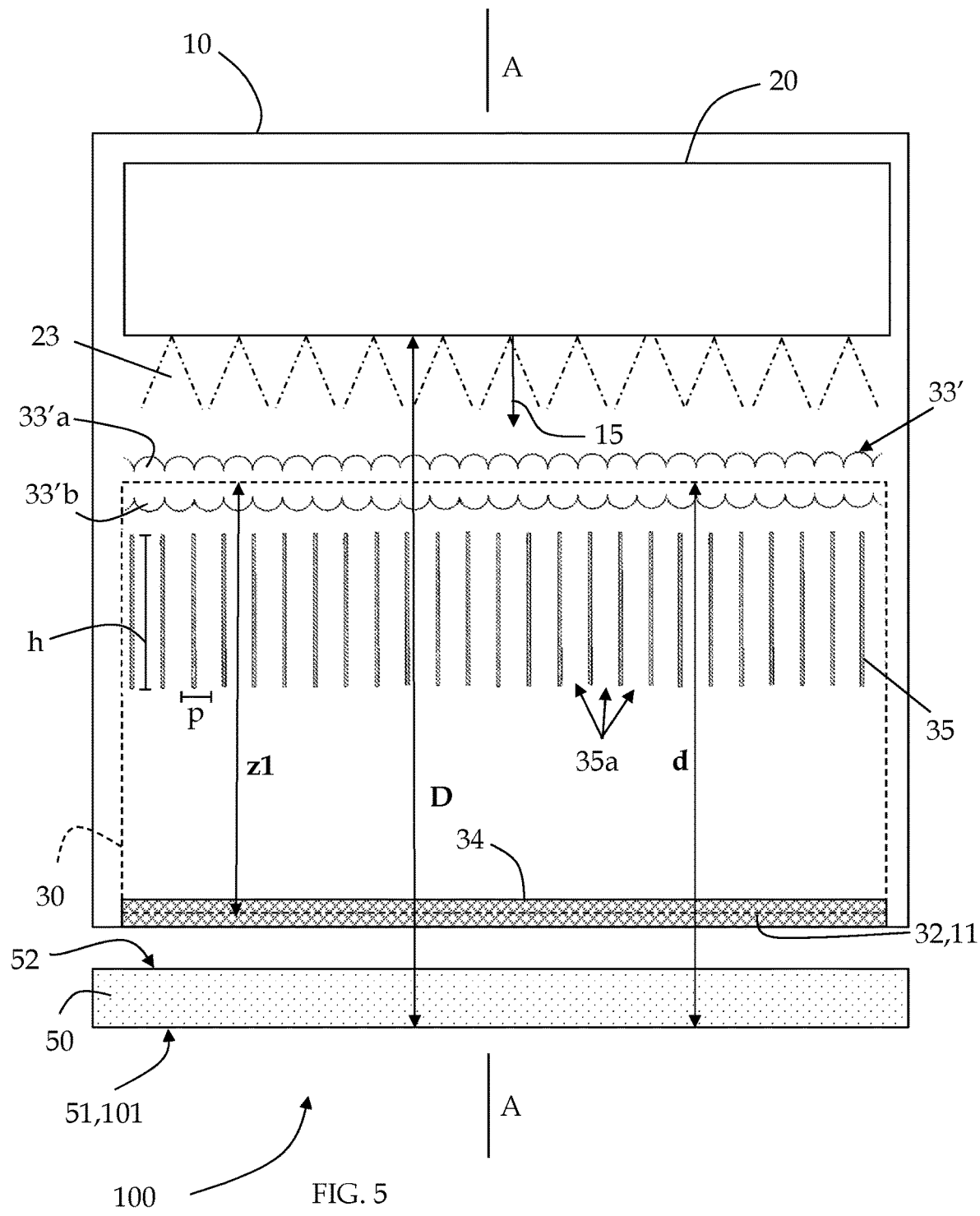
FIG. 5 schematically shows a sectional view of a sun-sky-imitating illumination device according to a fourth variant of the invention internally provided with a channel structure.
Figure 5A:
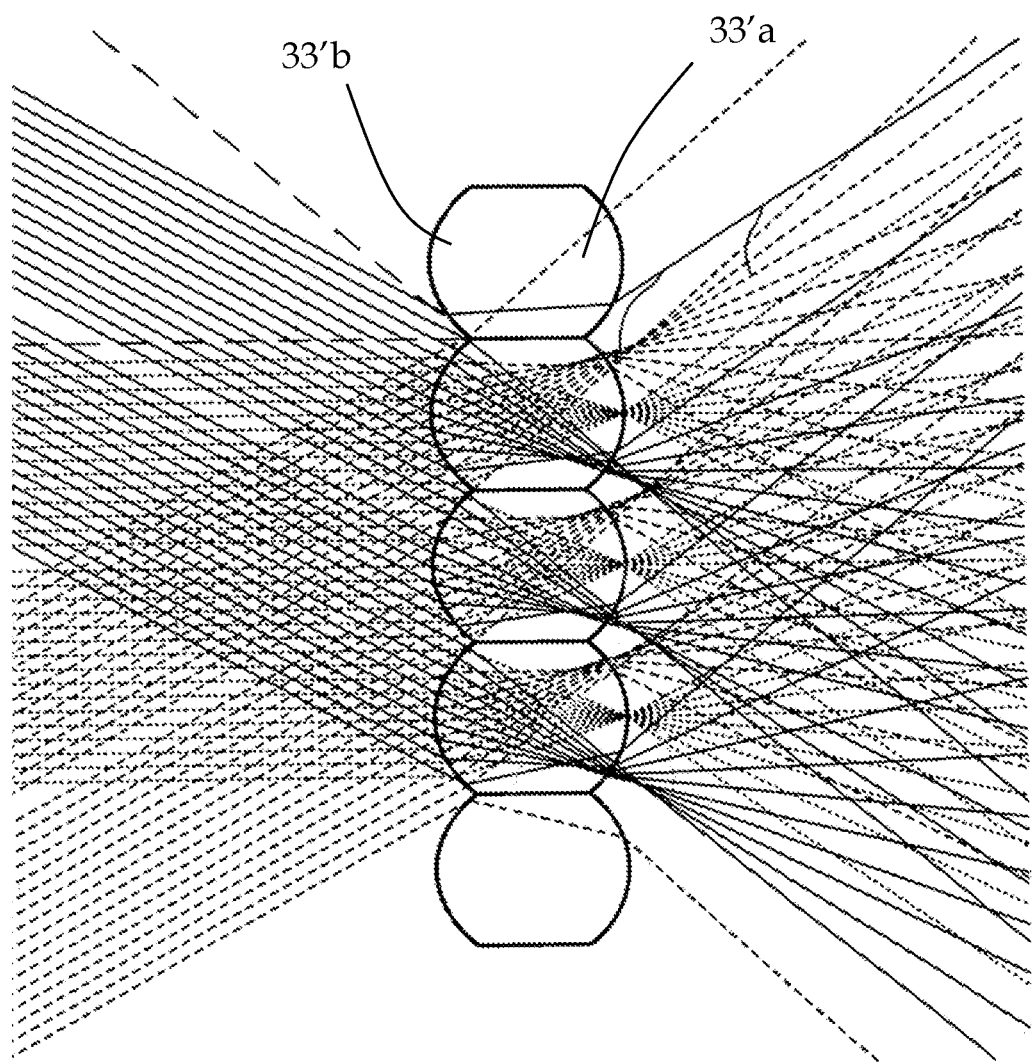
FIG. 5a is a schematic illustration of light rays interacting with the micro-optical light mixer of FIG. 5.

With regard to FIG. 5, a further preferred variant is shown according to which the first light mixing element is a micro-optical light mixer 33' made of a pair of micro-lens arrays 33'a,33'b. Each micro-lens of a first array 33'a of the pair of micro-lens arrays is positioned at focal distance with respect to a respective micro-lens of a second array 33'b of the pair of micro-lens arrays. Each of the first 33'a and second 33'b micro-lens array features a plurality of lenses optionally arranged in a square or hexagonal close-packing configuration. As shown in FIG. 5a with respect to three exemplary plane wave propagation directions, inside the micro-optical light mixer 33', the lenses of the first array 33'a focus each plane-wave component of the light impinging on the system to the surface of the lenses of the second array 33'b. In particular, the light is focused in a lateral position that is specific for the plane-wave propagation direction. The second lens array 33'b produces in the far field an image of the first lenses 33'a (e.g. a rectangle for rectangular lens aperture) when the first lenses 33'a are uniformly illuminated. In other words, the system remixes the light falling onto it such that, for each of the first lenses 33'a, one point of the first lens is imaged (is mapped) to a specific position in the far field. Accordingly, the resulting image in the far field is the superimposition of the images of all the first lenses 33'a which allows averaging possible spatial modulations in the light impinging onto the first lenses 33'a.

The micro-optical light mixer 33' used in the variant of FIG. 5 is associated with an acceptance angle α_acc that is determined by the focal length of its lenses and the aperture of its lenses. The micro-optical light mixer 33' is characterized by a response function to a collimated light pulse transmitted within the acceptance angle α_acc, which has an angular profile showing a peak with a divergence angle $α_{1'}$ measured as FWHM (full width at half maximum) of the peak equal to or smaller than 40° preferably smaller than 30°, more preferably smaller than 20°. The condition on the divergence angle $α_{1'}$ of the micro-optical light mixer response function assures that the luminance profile at the first emitting surface 11 still bears a narrow peak in the angular distribution around the direct-light direction.

In case the focal length of the lenses in the two arrays 33'a, 33'b is identical, the acceptance angle $\alpha\_acc$ of the mixer 33' is equal to the inverse tangent of half the aperture of its lenses divided by their focal length. Accordingly, for small acceptance angles $\alpha\_acc$, it corresponds to half of the divergence angle $\alpha'$ of the light exiting the mixer 33'. The mixer 33' usually comprises lenses with apertures ranging in dimensions between 0.3 and 10 mm, while their focal length usually is comprised between 2 mm and 20 mm. The aperture and focal length values are set so that the resulting acceptance angle $\alpha\_acc$ of the mixer 33' is smaller than 20° preferably smaller than 15°, more preferably smaller than 10° in order to assure that the mixer 33' response function is characterized by a divergence angle $\alpha_1$, with a FWHM (full width at half maximum) equal to or smaller than 40° preferably smaller than 30°, more preferably smaller than 20°.

Moreover, in a manner similar to the low-angle white-light diffuser 33 described with regard to the variants of FIG. 2 to FIG. 4, the micro-optical light mixer 33' of FIG. 5 is used to correct the luminance modulations of the collimated light 23 exiting the output surface 22 and impinging onto the second emitting surface 51, so that the illuminance distribution obtained at the second emitting surface 51 of the diffused-light generator 50 is uniform across the same 51. The micro-optical light mixer 33' acts in combination with the propagation distance d downstream of the mixer 33' itself, which in this case is the distance between the unit input surface 31 and the second emitting surface 51. In fact, the illuminance distribution obtained at the second emitting surface 51 depends, amongst other, on the distance between the mixer 33' placed at the unit input surface 31 and the second emitting surface 51. As in the previous variants, the propagation distance d of the variant of FIG. 5 is equal to or greater than the unit depth z1 of optical unit 30.

As a first approximation, in case of lens aperture below 3 mm, the micro-optical light mixer 33' behaves substantially as a low-angle white-light diffuser. Accordingly, the Applicant has identified that, also for this variant, the propagation distance d between the unit input surface 31 and the diffuser emitting surface 51 needs to be comprised between 1 cm≤d≤50 cm, preferably 2.5 cm≤d≤40 cm, more preferably 5 cm≤d≤30 cm, even more preferably between 10 cm≤d≤15 cm in case of divergence angles of the response function of the micro-optical light mixer 33'-measured as FWHM (full width at half maximum) of the response function peak—are equal to or smaller than 40° preferably smaller than 30°, more preferably smaller than 20°. Therefore, the constraints set out above on the unit depth z1 already assure that d is comprised within the above ranges.

Figure 6:
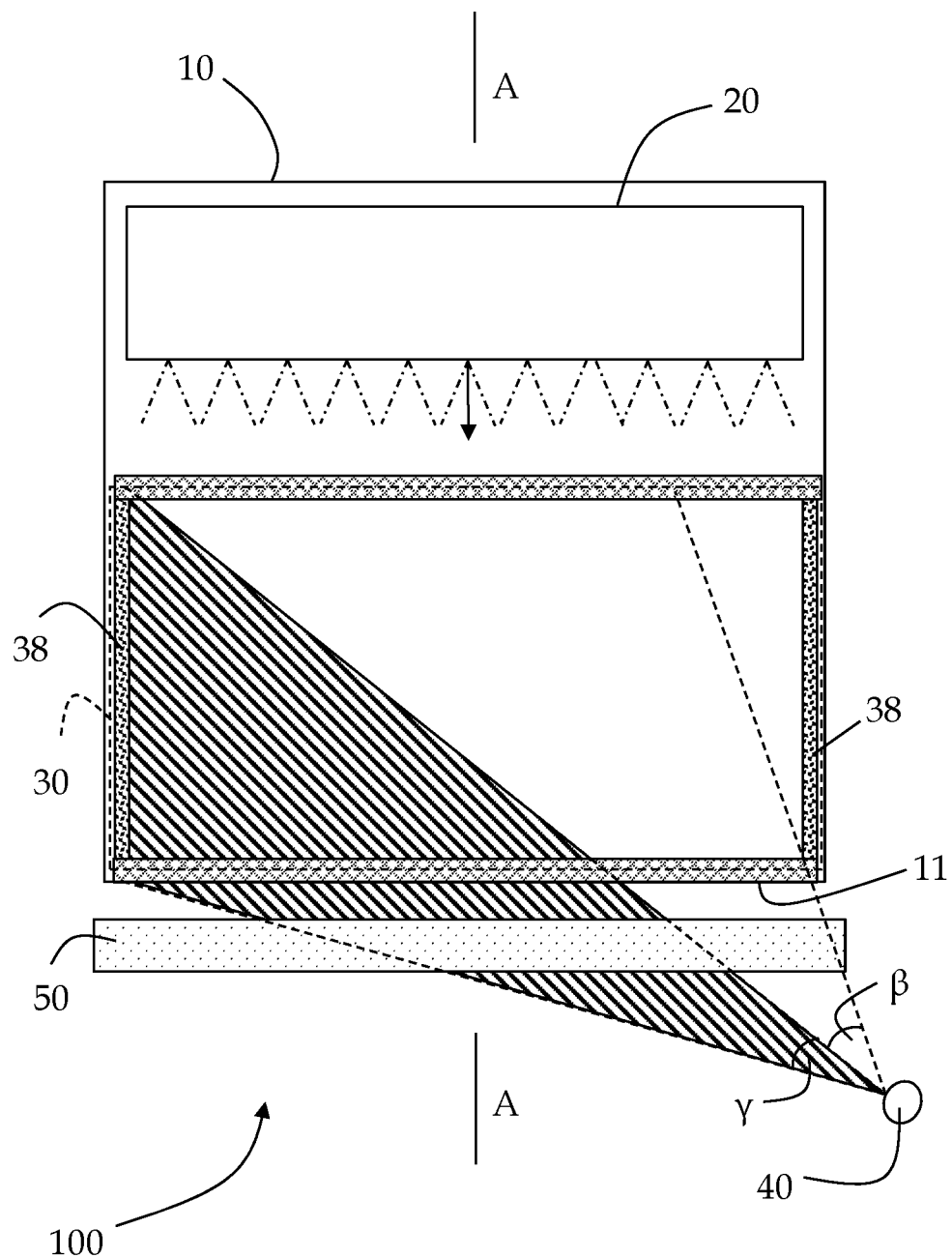
FIG. 6 schematically shows a sectional view of a sun-sky-imitating illumination device according to a fifth variant of the invention.

FIG. 6 shows a further variant of the invention, in which the optical unit 30 also comprises at least one lateral reflective surface 38 facing the inside of the optical unit 30. The lateral reflective surfaces 38 can be e.g. embodied as a reflective layer or coating applied on a surface of at least one lateral wall which faces the inside of the optical unit 30, with the layer or coating made of a material with a reflectance factor $\eta\_r>70\%$, preferably $\eta\_r>80\%$, more preferably $\eta\_r>90\%$. Alternatively, the lateral reflective surface 38 is embodied by the lateral wall itself being made of a material with a reflectance factor $\eta\_r>70\%$, preferably $\eta\_r>80\%$, more preferably $\eta\_r>90\%$.

Figure 6A:
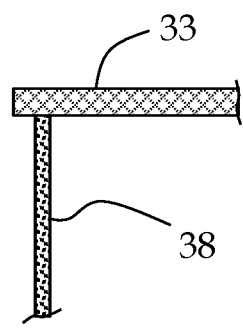
FIGS. 6a to 6d show different configurations of the relative positioning of the lateral reflective surface of FIG. 6 with respect to the first light mixing element and the channel structure, respectively.
Figure 6B:
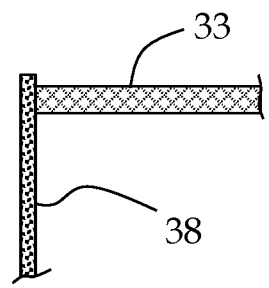
Figure 6C:
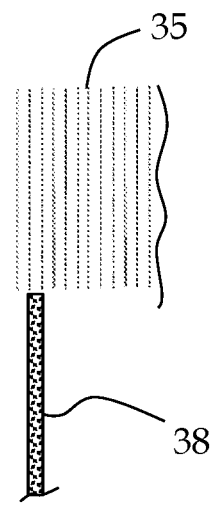
Figure 6D:
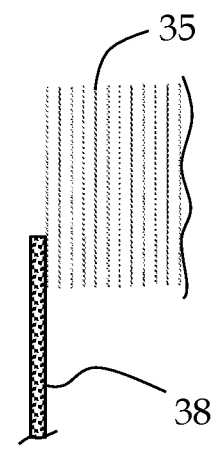

The lateral reflective surfaces 38 preferably abut (as shown in FIGS. 6 and 6a) or overlap along the direct light direction (as shown in FIG. 6b) the first light mixing element 33,33' so as to form an image of a seamless surface made of the first light mixing element 33,33' or a portion thereof, and its image reflected onto the lateral surfaces 38. In case the optical unit 30 also comprises the channel structure 35 positioned downstream of the first light mixing element 33, the lateral reflective surfaces 38 preferably abut (as shown in FIG. 6c) or overlap along the direct light direction (as shown in FIG. 6d) the plane defined by the end of the channels 35a facing the second light mixing element 34 so as to form an image of a seamless surface made of the said plane or a portion thereof, and its image reflected onto the lateral surfaces 38. Moreover, the lateral reflective surfaces 38 extend towards the the second light mixing element 34, preferably transversal, more preferably orthogonally to the first light mixing element 33,33'. In the variant of the invention shown in FIG. 6, the reflective lateral surfaces 38 substantially extend up to and abut the second light mixing element 34.

FIG. 6 schematically shows an observer 40 which is positioned to see the sun-sky-imitating illumination device 100 at an angle outside of the narrow peak of the luminance profile exiting the second emitting surface 51. The light which reaches the observer 40 in this position is generated from two main contributions: the diffused light component 53 which propagates along directions spaced apart from the narrow peak exiting the second emitting surface 51 and a background light component which is less intense and still propagates along directions spaced apart from the narrow peak exiting second emitting surface 51, the background light component being generated by a non-ideal feature of the light stemming from the first planar light mixing element 33,33' placed at the input surface 31, or a non-ideal behavior of the collimated light 23 which exits emitting surface 22. The background light component is seen by an observer as a uniform low-intensity illumination present in the background of the diffused light component 53.

Returning to FIG. 6, inside a first solid angle $\beta$, both the above components are present, while inside a second solid angle $\gamma$, there is no direct contribution of the background light component, as this background light component can reach the observer only by reflection upon lateral surface 38. Accordingly, in the absence of a reflective lateral surface 38 and in case of a unit depth z1 e.g. higher than 1 cm, an observer positioned at a steep observation angle (as shown in FIG. 6), would see a transition between a brighter and a darker region in the second emitting surface 51. This would spoil the uniformity requirement set on the luminance profile Ldirect2 of the direct light component 54 which exits the second emitting surface 51.

According to the variant of FIG. 6, for a reflectance factor of the reflecting lateral surface 38 higher than 70%, preferably higher than 80%, more preferably higher than 90%, the difference in intensity between the background light component present inside solid angle $\gamma$ and solid angle $\beta$ is minimized due to the reflection by the reflecting lateral surface 38 inside solid angle $\gamma$. Because of the minimized difference in intensity between the background light components inside solid angles $\gamma$ and $\beta$, the observer does not distinguish between two different portions of the second emitting surface 51, namely a brighter and a darker region. The uniformity constraint of the luminance profile Ldirect2 of the direct light component 54 which exits the second emitting surface 51 is so fulfilled.

Figure 7:
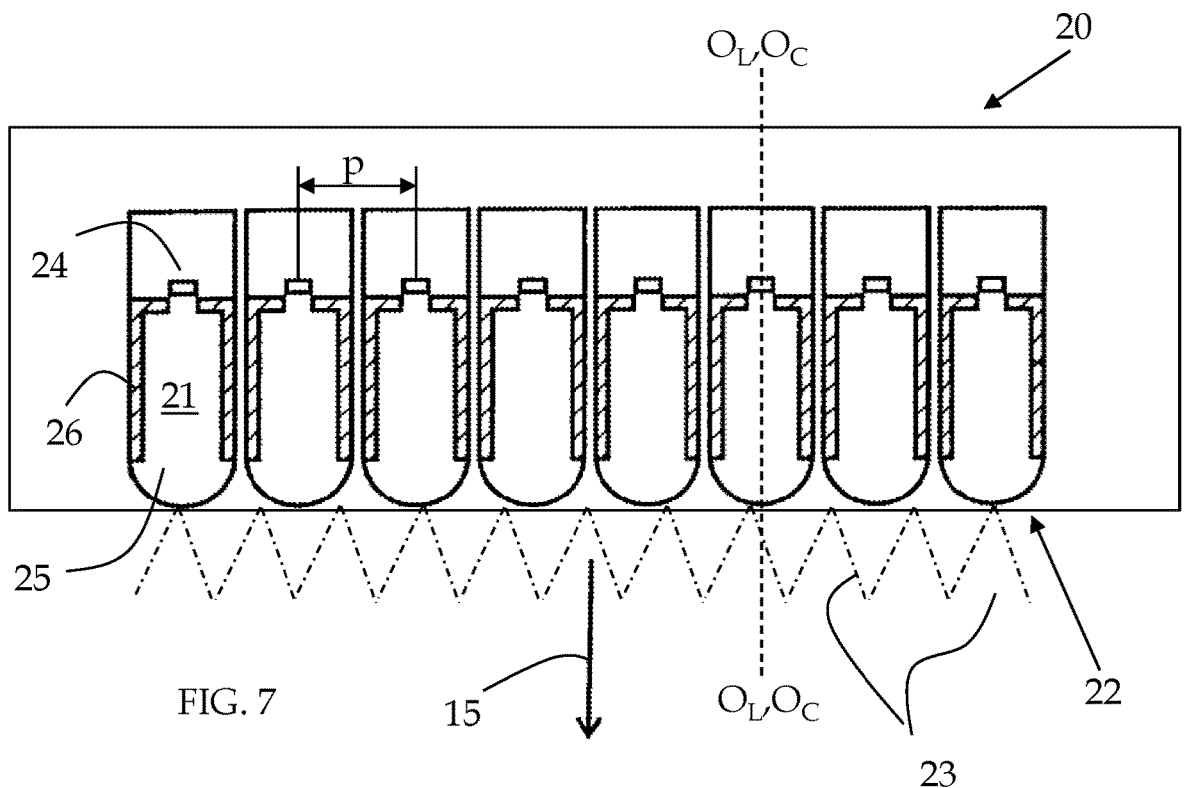
FIG. 7 schematically shows a sectional view of a first exemplary embodiment of a direct-light generator used in a sun-sky-imitating illumination device according to a variant of the invention.

FIG. 7 shows a first embodiment of the collimated light source 20 constructed such that it comprises a 2-dimensional array of LEDs as light-emitting devices 21. In particular, each of LEDs 21 comprise a light emitter 24, such as a light emitting diode comprising phosphor and/or dye or the like and a collimator 25, e.g. a dome lens, wherein the collimator 25 is positioned at a distance from the light emitter 24 substantially equal to the collimator focal length. Optionally, the light emitters 24 have a circular cross section in a plane perpendicular to the direct light direction 15, in order to facilitate the achievement of a luminance distribution independent of the azimuthal coordinate. For the same purpose, non-circular light emitters may comprise circular apertures, which trim their cross-sections in a circular shape. Each light emitter 24 is housed in a dark housing 26 which is at least internally coated with or made of light absorbing material and has an aperture where the collimation lens 25 is positioned. The material or coating of the inner walls of the dark housing 26 preferably has an absorption coefficient $\eta\_abs$ for visible light preferably greater than 70%, more preferably 90%, even more preferably 95%.

In case the cross section of the light emitter 24 is square-shaped, its image generated at infinite optical distance by the collimation lens 25 has a square shape, resulting in a luminance profile Lcoll (x, y, θ, φ) of the collimated light 23 which is dependent on the azimuthal coordinate φ, such profile having a square-shaped peak section in angular coordinates. The Applicant identified that, by means of the optical unit 30 which comprises at least a first 33,33' and a second 34 light mixing element, at least one of which has a symmetric response function, a square-shaped angular peak of the luminance profile Lcoll (x, y, θ, φ) is blurred to a circular-shaped peak of the luminance profile Ldirect (x, y, θ, φ) of the direct light 13 which exits the first emitting surface 11, provided that the divergence angle of the response function characterizing at least one of the light mixing elementss 33,33',34 has a FWHM substantially equal to or wider than the angular dimension of the square-shaped peak itself. Since the image of the light emitter 24 generated by the corresponding collimation lens 25 is positioned at infinite optical distance, the real distance between the at least one light mixing elements 33,33',34 and the light emitters 24 is not relevant for the blurring effect thus described.

Figure 8:
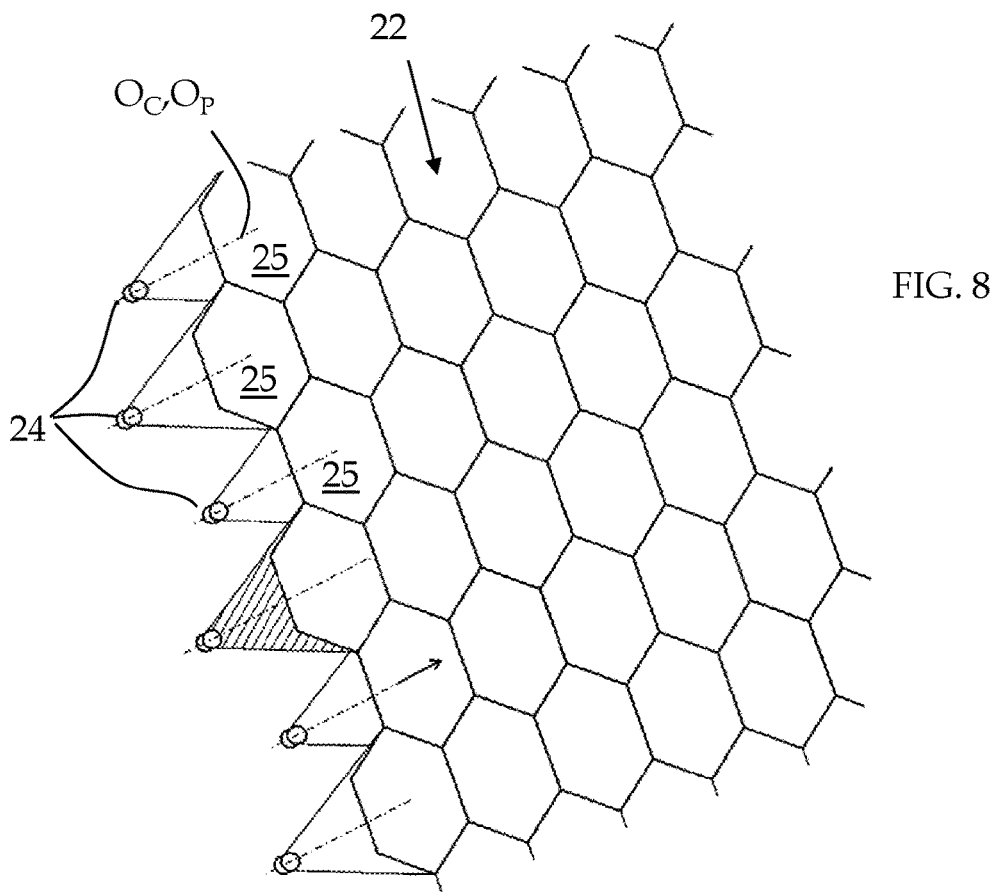
FIG. 8 schematically shows a three-dimensional view of an array of pairs of light emitter and collimation lens so as to result in a direct-light generator in accordance with the embodiment of FIG. 7.

As shown in FIG. 8, each pair of light emitter 24 and respective collimation lens 25 may be packed closely, such as in a hexagonal manner, and in juxtaposition so that the collimation lenses 25 of the pairs abut each other so as to form a joined continuous surface that covers an area substantially as wide as the output surface 22. Additionally to output surface 22, the joined continuous surface comprises regions from which no collimated light exits, like e.g. the perimeter lines of the collimation lenses 25 which overlap the perimeter lines of the dark housings 26.

The packing of the pairs may be with a pitch p that is usually smaller than 6 cm, preferably smaller than 4 cm, more preferably smaller than 1 cm. The optical axes $O_L, O_C$ of the individual pairs of light emitter 24 and lens 25 may be arranged to extend parallel to each other and parallel to the direct-light direction 15, respectively. However, the array of lenses 25 and the array of light emitters 24 may be displaced relative to each other such that the optical axes $O_C$ of the lenses 25 are offset from the positions of the light emitters 24 so as to result in a direct-light direction 15 which is oblique relative to the plane within which the apertures of lenses 25 are positioned and distributed, respectively.

The collimated light source 20 of FIG. 7 may suffer of stray light originating from a non-ideal behavior of the dark housings 26. Owing to the reflection from the dark housing walls, in case they have a non-ideal absorption, the dome lens 25 lit by the respective light-emitting device 21 may have a luminance profile which does not go to zero out of the narrow peak 14. In contrast, it may be featured by a residual profile, which is also structured both in angle and in position, which finally might make the lenses 25 resulting in a clearly visible and luminous object, whereas, in contrast, a complete dark or uniform background would be needed in order to achieve an infinite depth perception. However, the spatial non-uniformity given to the structuring in position is improved by the optical effect of the optical unit 30 positioned downstream of the collimated light source 20.

Figure 9:
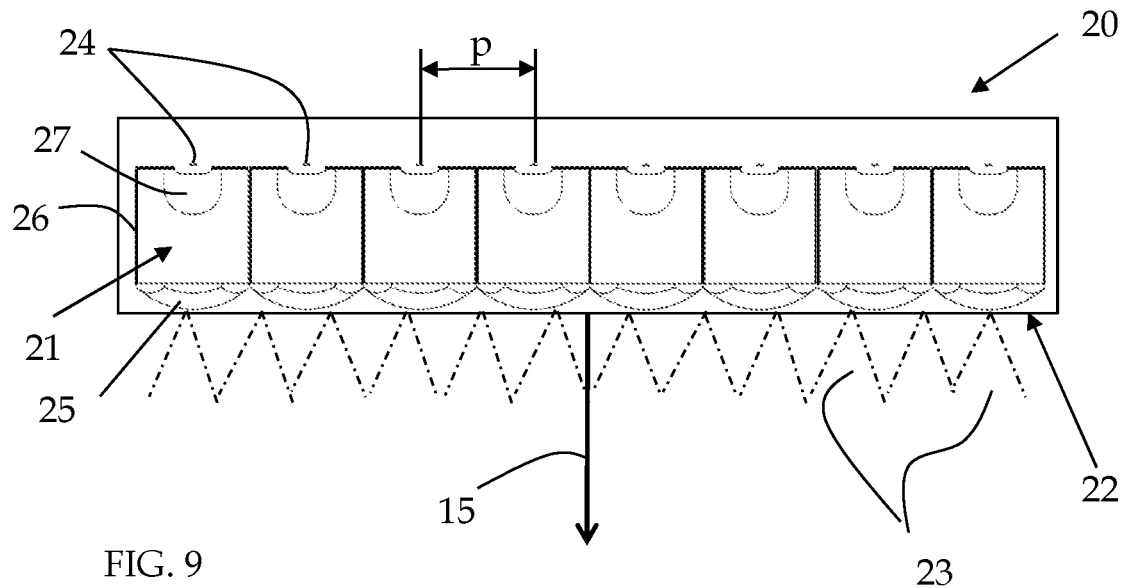
FIG. 9 schematically shows a sectional view of a second exemplary embodiment of a direct-light generator used in a sun-sky-imitating illumination device according to a variant of the invention.

FIG. 9 shows a second embodiment of the collimated light source 20 comprising an array (e.g. two-dimensional) of light-emitting devices 21. In particular, each light emitting device 21 comprises a light emitter 24, such as a light emitting diode, to which a pair of collimation lenses 27,25 is associated comprising a pre-collimation lens 27 and a collimation lens 25 positioned downstream of the pre-collimation lens 27 with respect to the light propagation direction 15. Each light emitter 24 and each pre-collimation lens 27 of the pair of collimation lenses are housed in a dark housing 26 which is made of light absorbing material and has an aperture where the collimation lens 25 of the pair of collimation lenses is positioned. Also with regard to the embodiment of FIG. 9, the material of which the inner walls of the dark housing 26 are made or coated has an absorption coefficient $\eta\_abs$ for visible light preferably greater than 70%, more preferably 90%, even more preferably 95%.

The first pre-collimation lens 27 is positioned almost in contact to or proximal to the light emitter 24 and is configured to perform a pre-collimation of the light emitted by the light emitter 24 in order to reduce its divergence (e.g. approximately to 40°-50°. The second collimation lens 25 is positioned at a distance from a virtual image of the light emitter 24 generated by the pre-collimation lens 27 substantially equal to the focal length of the second collimation lens 25. The pair of collimation lenses 27,25 is configured to obtain a uniform spatial distribution of the illuminance projected onto a surface directly downstream of the output surface 22. In the second embodiment of FIG. 9, each pre-collimation lens 27 is configured to emit with a uniform angular profile within an emission cone having a half angular aperture preferably comprised between 10° and 36°, more preferably between 13° and 33°, even more preferably between 18° and 30°, namely with an angularly constant intensity, and to uniformly illuminate a whole light input surface 25a of the collimation lens 25. In detail, the pre-collimation lenses 27 are configured to flatten the illuminance distribution of the light emitted by the light emitter 24 onto the collimation lens input surface 25a.

Figure 9A:
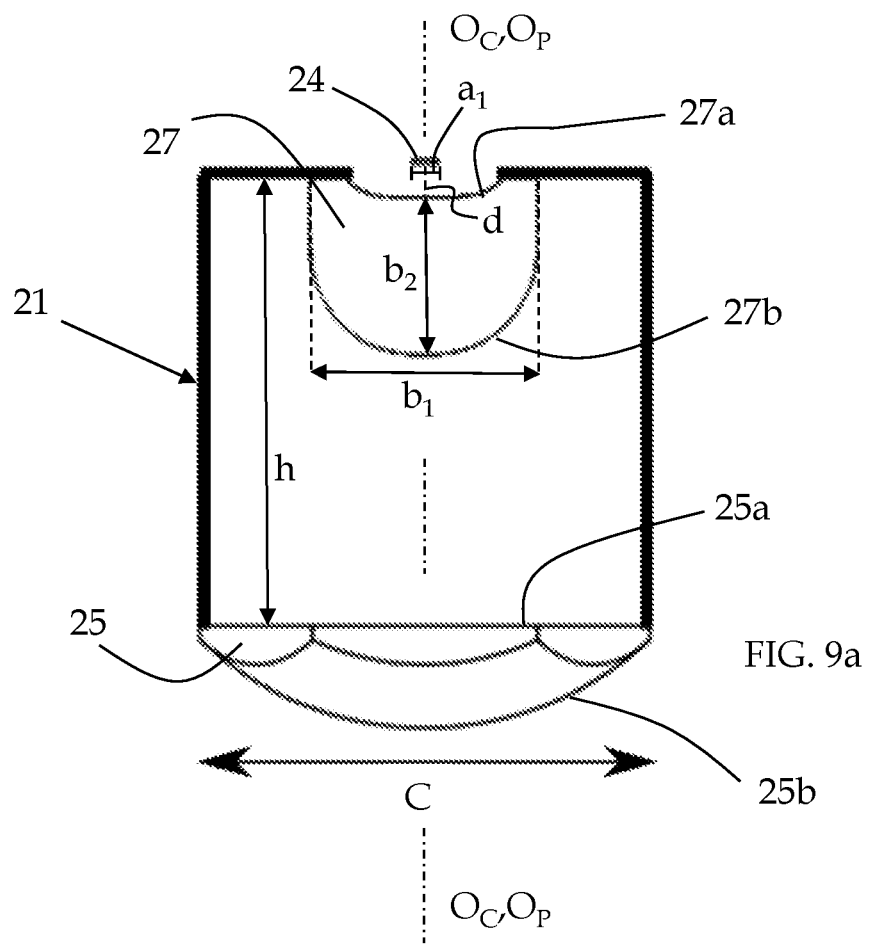
FIG. 9a is an enlarged view of a detail of the direct-light generator according to the second embodiment of FIG. 9.

As shown in detail in FIG. 9a, the first pre-collimation lens 27 preferably comprises a concave-curved light inlet surface 27a facing the light emitter 24 at its emitting surface and a convex-curved light outlet surface 27b. In particular, the inlet and the outlet surfaces 27a, 27b have both an aspheric profile. It is however seen that other implementations of the pre-collimation lens 27 are possible featuring a planar or slightly convex light inlet surface 27a or different profiles like e.g. a profile having a section featuring two concave bows, a spherical profile or a profile as a hyper-hemisphere. The pre-collimation lens 27 is preferably a singlet or doublet (namely a body made of two materials having different refractive indexes) made of a thermoplastic polymers (e.g. PMMA, PC) or glass.

Due to its symmetry, the first pre-collimation lens 27 of FIG. 9a has a first optical axis $O_P$ and the convex-curved light outlet surface 27b of the pre-collimation lens 27 has a first radius of curvature r1 at the first optical axis $O_P$. Moreover, the collimation lens 25 of FIG. 9a has second optical axis $O_C$ (which in the embodiment of FIG. 9a coincides with the first optical axis $O_P$) and the convex-curved light output surface 25b of the collimation lens 25 has a second radius of curvature r2 at the second optical axis $O_C$. Advantageously, the first radius of curvature r1 is smaller than the second radius of curvature r2. Furthermore, the collimation lens input surface 25a of the embodiment of FIG. 9a is flat (accordingly with an infinite radius of curvature). In other embodiments, the collimation lens input surface 25a may be curved.

In detail, Applicant identified unexpected dimensional relations between the pre-collimation lens 27 and the collimation lens 25 and their relative positioning, which optimize light emission in terms of best trade-off between collimation effect and minimal chromatic aberration.

As shown in FIG. 9a, the pre-collimation lens 27 is characterized by a maximum width b1 and a height b2. The pre-collimation lens height b2 refers to the distance between the intersection points between a straight line orthogonal to a plane comprising the light emitter 24 emitting surface and passing through a center of mass of the pre-collimation lens 27 and respectively, (a) the pre-collimation lens inlet surface 27a and (b) the pre-collimation lens outlet surface 27b. In the embodiment shown in FIG. 9a, the straight line orthogonal to a plane comprising the light emitter 24 emitting surface and passing through the center of mass of the pre-collimation lens 27 coincides with the optical axis $O_P$ of the pre-collimation lens 27. The pre-collimation lens maximum width b1 refers to the maximum value between a plurality of local width values each referring to a (different) plane which intersect the pre-collimation lens 27 parallel to the light emitter 24 emitting surface, wherein each local width value is defined as the maximum distance between any two points comprised in a section area defined by the intersection of the pre-collimation lens 27 with the corresponding parallel plane.

The pre-collimation lens 27 is positioned at a distance h from the collimation lens 25 (measured between a base of the inlet surface 27a and a base of the input surface 25a) and is characterized by a maximum width C of the collimation lens 25 (measured analogously as defined for the maximum width of the pre-collimation lens 27). The base of the lens input/inlet surface 27a,25a refers to the nearest parallel plane to the light emitter 24 emitting surface still intersecting at least a point of the lens input/inlet surface 27a,25a.

The light emitter 24 emitting surface is spaced apart from the light inlet surface 27a of the pre-collimation lens 27 of a gap d, having a maximum value comprised between 0.01 and 0.04 times the lenses distance h, preferably 0.015-0.035 times the lenses distance h, even more preferably substantially equal to 0.025 times the lenses distance h. In the embodiment of FIG. 9a, the light emitter 24 is positioned outside of the free space delimited by the curved light inlet surface 27a. Accordingly, the constraints on the gap d imply that the concave curved light inlet surface 27a has a maximum height (measured along the optical axis $O_P$ of the pre-collimation lens 27) which is less or at most equal to 0.01-0.04 times the distance h.

With respect to the above dimensions, Applicant identified that in order to minimize chromatic aberration and concurrently maximize light collimation, the relation between the lenses distance h and the maximum width C of the collimation lens 25 substantially corresponds to the relation between the height b2 and the maximum width b1 of the pre-collimation lens 27. In detail, Applicant identified that in order to minimize chromatic aberration and concurrently maximize light collimation, both, the ratio C/h and the ratio b1/b2 are preferably comprised in the range of 0.8-1.6, more preferably comprised between 0.85 and 1.4, even more preferably between 0.90 and 1.3. Moreover, Applicant identified that in order to minimize chromatic aberration and concurrently maximize light collimation, the ratio b2/h between the height b2 of the pre-collimation lens 27 and distance h is comprised in the range of 0.2-0.8, more preferably in the range between 0.25-0.75 and even more preferably in the range between 0.3-0.7. Not least, in addition or in alternative, Applicant identified that in order to minimize chromatic aberration and concurrently maximize light collimation, the ratio b1/C between the pre-collimation lens maximum width b1 and the collimation lens maximum width C is comprised in the range of 0.3-0.8, more preferably in the range between 0.35-0.75 and even more preferably in the range between 0.4-0.7. Also, Applicant identified that the ratio a1/b1 between a width a1 of the light emitter 24 emitting surface (measured as maximum distance between any two points comprised in the light emitter 24 emitting surface) and the pre-collimation lens 27 maximum width b1 preferably ranges between 0.2 (1:5) and 0.04 (1:25). Moreover, Applicant realized that ratio r2/r1 between the radius of curvature r2 of the light output surface 25b of the collimation lens 25 at the collimation lens optical axis $O_C$ and the radius of curvature r1 of the light outlet surface 27b of the pre-collimation lens 27 at the pre-collimation lens optical axis $O_P$ needs to be comprised between 1.5 and 6, more preferably between 1.5 and 10. The combination of these relations assures the best distribution between the pre-collimating and the subsequent collimating action, thereby obtaining a highly collimated light (e.g. with a peak in the polar angle profile having HWHM preferably smaller than 10°) with minimal chromatic aberration.

Figure 10:
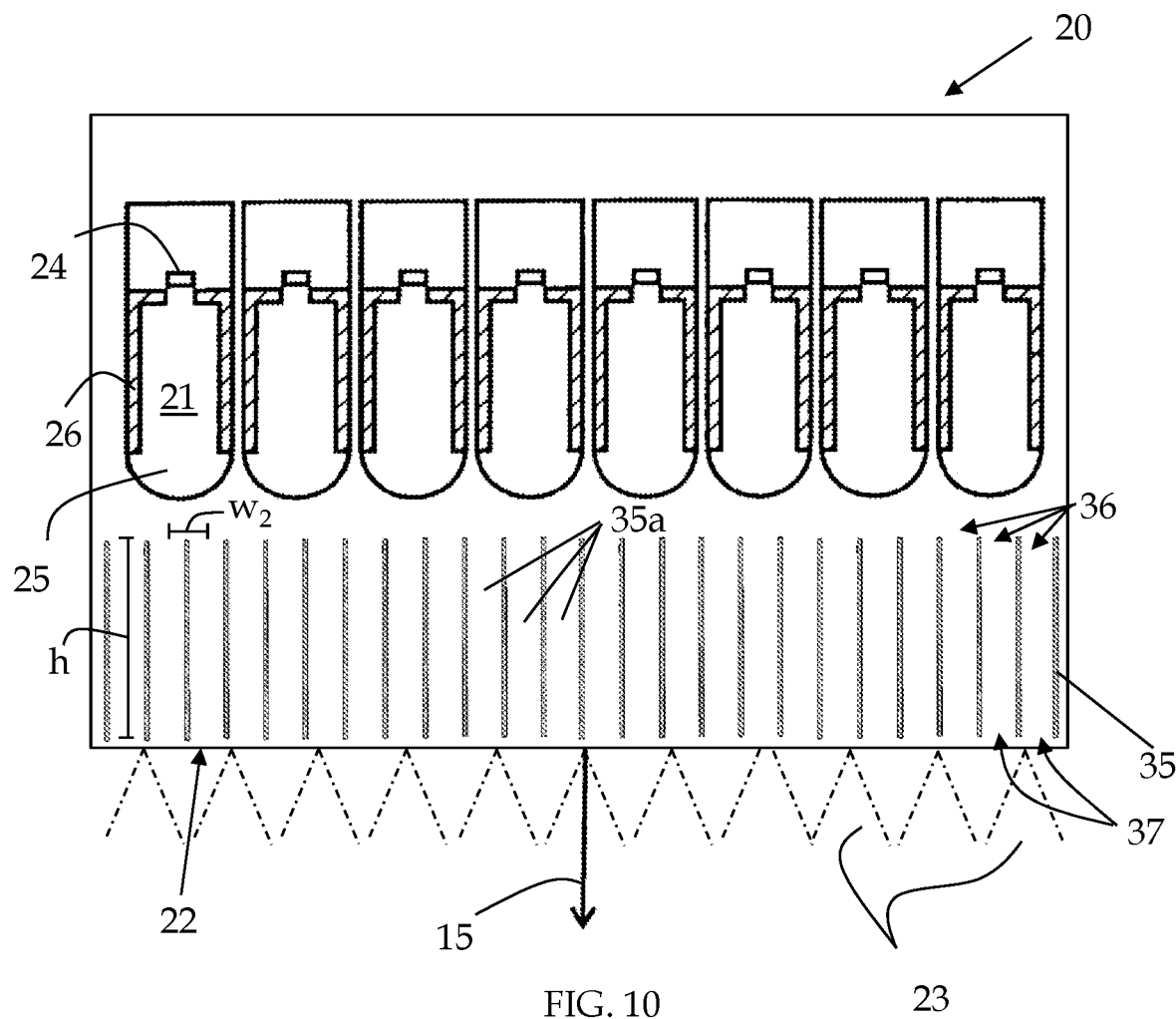
FIG. 10 schematically shows a sectional view of a third exemplary embodiment of a direct-light generator used in a sun-sky-imitating illumination device according to a variant of the present invention internally provided with a channel structure.

FIG. 10 shows a third preferred embodiment of the collimated light source 20 which additionally to the first preferred embodiment shown in FIG. 7 comprises a channel structure 35 positioned directly downstream of the array of light-emitting devices 21. The channel structure 35 thus positioned, is able to transform a first collimated light beam featured by the presence of stray light emitted by the light-emitting devices 21 and that impinges onto said channel structure 35 into a second collimated light 23 which is free from stray light propagating at an angle higher than a cut angle α_cut. Accordingly, the second collimated light 23 exiting the output surface 22 is characterized by a reduced stray light, e.g. with a luminance profile with background below 1% of the peak luminance value, but possibly still showing visible structures due to inhomogeneities in the luminance profile. However, according to the invention, in case of inhomogeneities, these are strongly reduced by means of the optical unit 30.

The invention claimed is:
1. An illumination device comprising:
   a direct-light generator that comprises
     a collimated light source configured to generate, from a primary light, a collimated light having a spatial modulation, the collimated light exiting an output surface positioned upstream from a first emitting surface from which a direct light is emitted;
   a diffused-light generator that is positioned downstream of the direct-light generator and comprises a second emitting surface, the diffused-light generator being configured to emit diffused light at the second emitting surface; and an optical unit positioned downstream of the output surface of the collimated light source and upstream from the first emitting surface, the optical unit comprising a first planar light mixing element positioned so as to at least partially intercept the collimated light exiting the output surface of the collimated light source and to define a unit input surface, and a second planar light mixing element positioned downstream of the unit input surface so as to at least partially intercept the light crossing the unit input surface and to define a unit emitting surface, wherein the first planar light mixing element is spaced apart from the second emitting surface by a propagation distance d such that, at the second emitting surface, the spatial modulation of the collimated light subtends an angle that is less than or equal to a divergence angle of a response function of the first planar light mixing element.

2. The illumination device of claim 1, wherein the first and second planar light mixing elements are spaced apart from each other by a minimum unit depth (z1) that is configured to obtain uniform luminance of the direct light that exits the first emitting surface of the direct-light generator.

3. The illumination device of claim 1, wherein at least one of the first planar light mixing element and the second planar light mixing element is a low-angle white light diffuser characterized by a response function having an angular profile with a peak having a divergence angle, the low-angle white light diffuser being configured to cause a blurring of the peak in the luminance profile (Lcoll (x, y, θ, φ)) of the collimated light exiting the output surface.

4. The illumination device of claim 3, wherein the second planar light mixing element is a low-angle white light diffuser that is integrated in the diffused-light generator as a dispersion of transparent microparticles or a superficial random distribution of micro-refractors formed in at least one of the second emitting surface and a diffuser input surface of the diffused-light generator.

5. The illumination device of claim 3, wherein the low-angle white light diffuser comprises at least one of:

a random distribution of micro-refractors formed in an outer surface of a transparent layer or bulk material, and a dispersion of transparent microparticles in a transparent layer or bulk material, wherein the microparticles and the layer or bulk material experience a refractive-index mismatch.

6. The illumination device of claim 1, wherein the first planar light mixing element is a micro-optical light mixer comprising a pair of micro-lens arrays, wherein each micro-lens of a first array of the pair of micro-lens arrays is positioned at a focal distance with respect to a respective micro-lens of a second array of the pair of micro-lens arrays so that the micro-lenses of the second array produce in the far field an image of the respective micro-lens of the first array, wherein the micro-optical light mixer is characterized by an acceptance angle ($\alpha\_acc$) and a response function to a collimated light pulse transmitted within an acceptance angle ($\alpha\_acc$) having an angular profile showing a peak with a divergence angle ($\alpha_1'$) measured as full width at half maximum (FWHM) of the peak.

7. The illumination device of claim 1, wherein the optical unit additionally comprises a bidimensionally extending channel structure comprising a plurality of side-by-side aligned channels.

8. The illumination device of claim 7, wherein the side-by-side aligned channels are formed by void volumes separated by walls, wherein the walls separating the void volumes of the channels are made of or coated with a light absorbing material having an absorption coefficient for visible light greater than 70%.

9. The illumination device of claim 7, wherein the side-by-side aligned channels are distributed adjacent to each other in a close-packing arrangement.

10. The illumination device of claim 1, wherein the optical unit comprises at least one lateral surface extending transversal with respect to the first planar light mixing element and facing towards the inside of the optical unit, wherein each lateral surface is coated or made of a material with a reflectance factor $\eta\_r > 70\%$.

11. The illumination device of claim 10, wherein the at least one lateral surface abuts or overlaps the first planar light mixing element or a plane defined by an end of the plurality of side-by-side aligned channels facing the second light mixing element, and extends towards the second light mixing element.

12. The illumination device of claim 1, wherein the collimated light source comprises an array of light-emitting devices each comprising a light emitter and at least one collimation lens illuminated by the light emitter, the light emitter being housed in a hollow housing which is at least partially made of or internally coated with light absorbing material having an absorption coefficient for visible light greater than 70%, and has at least an aperture where the at least one collimation lens is positioned.

13. The illumination device of claim 12, wherein the collimated light source further comprises a channel structure positioned downstream of the array of light-emitting devices and upstream from the output surface, the channel structure being configured to transform a first collimated light beam featured by the presence of stray light emitted by the light-emitting devices and that impinges onto the channel structure into a second collimated light substantially free from stray light propagating at an angle higher than a cut angle ($\alpha\_cut$).

14. The illumination device of claim 1, wherein:

the first planar light mixing element is characterized by a first response function having a first angular profile with a peak having a first divergence angle, and the second planar light mixing element is characterized by a second response function having a second angular profile with a peak having a second divergence angle.

15. The illumination device of claim 14, wherein the first divergence angle is measured as a full width at half maximum of the peak of the first angular profile and the second divergence angle is measured as a full width at half maximum of the peak of the second angular profile.

16. The illumination device of claim 1, wherein the direct-light generator and the diffused-light generator cooperate to form outer light at the second emitting surface, the outer light comprising a first light component that propagates along directions contained within a narrow peak and a second light component that propagates along directions spaced apart from the narrow peak, the first light component having a correlated color temperature that is lower than a correlated color temperature of the second light component.

17. The illumination device of claim 1, wherein illumination device is configured for generating natural light similar to that from the sun and sky, and the first light component has a CCT that is lower than a CCT of the second light component.

18. The illumination device of claim 1, wherein the spatial modulation of the collimated light is greater than or equal to 0.5 mm and less than or equal to 30 mm.

19. The illumination device of claim 1, wherein the spatial modulation of the collimated light is in a sub-millimeter range, and the first divergence angle is equal to or smaller than 20°.

20. A sun-sky-imitating illumination device for generating natural light similar to that from the sun and the sky, the illumination device comprising:
a direct-light generator that comprises
a first emitting surface from which a direct light is emitted; and
a collimated light source configured to generate, from a primary light, a collimated light which exits an output surface positioned upstream from the first emitting surface with respect to a direct-light direction,
wherein the direct light has a luminance profile (Ldirect (x, y, θ, φ) which has a first peak in the angular distribution around the direct-light direction and the collimated light exiting the output surface has a luminance profile (Lcoll(x, y, θ, φ) which has a second peak in the angular distribution around the direct-light direction, the second peak being a narrow peak, and
a diffused-light generator that is at least partially light-transparent and is positioned downstream of the direct-light generator and comprises a second emitting surface and is configured to emit diffused light at the second emitting surface,
wherein the sun-sky-imitating illumination device is configured such that the direct-light generator and the diffused-light generator co-operate to form outer light at the second emitting surface which comprises a first light component which propagates along directions contained within the narrow peak and a second light component which propagates along directions spaced apart from the narrow peak,
wherein the first light component has a CCT which is lower than a CCT of the second light component,
wherein the direct-light generator comprises an optical unit positioned downstream of the output surface of the collimated light source and upstream from the first emitting surface with respect to the direct light direction, wherein the optical unit is configured to interact with the collimated light exiting the output surface to generate the direct light emitted from the first emitting surface so that the first peak of the luminance profile (Ldirect(x, y, θ, φ) of the direct light is larger than the second peak of the luminance profile (Lcoll(x, y, θ, φ) of the collimated light, the optical unit comprising
a first planar light mixing element characterized by a first response function having a first angular profile with a peak having a first divergence angle, the first planar light mixing element being positioned so as to at least partially intercept the collimated light exiting the output surface of the collimated light source and to define a unit input surface, and
a second planar light mixing element characterized by a second response function having a second angular profile with a peak having a second divergence angle, the second planar light mixing element being positioned downstream of the unit input surface so as to at least partially intercept the light crossing the unit input surface and to define a unit emitting surface,
wherein the first and second divergence angles are equal to or smaller than 40°, and
wherein the first and second planar light mixing elements are spaced apart from each other at least of a minimum unit depth (z1) measured along the direct light direction, configured to obtain uniform luminance of the direct light which exits the first emitting surface of the direct light generator,
wherein the collimated light source comprises an array of light-emitting devices each comprising a light emitter and at least one collimation lens illuminated by the light emitter, and each light-emitting device further comprises a pre-collimation lens positioned upstream from the collimation lens and substantially in contact with or proximal to the light emitter, the pre-collimation lens being configured to emit with a substantially angularly constant intensity within an emission cone, and to uniformly illuminate a whole light input surface of the collimation lens.

21. The illumination device of claim 20, wherein the pre-collimation lens comprises a concave-curved light inlet surface facing the light emitter and a convex-curved light outlet surface.

22. The illumination device of claim 21, wherein the concave-curved light inlet surface and the convex-curved light outlet surface have an aspheric profile.

23. A direct-light generator of an illumination device, the direct-light generator comprising:
a first emitting surface;
a collimated light source configured to generate, from a primary light, a collimated light that exits an output surface positioned upstream from the first emitting surface with respect to a direct light direction; and
an optical unit positioned downstream of the output surface of the collimated light source and upstream from the first emitting surface with respect to the direct light direction, the optical unit comprising:
a first planar light mixing element defined by a first response function having a first angular profile with a peak having a first divergence angle, the first planar light mixing element being positioned so as to at least partially intercept the collimated light exiting the output surface of the collimated light source and to define a unit input surface, the first planar light mixing element comprising a low-angle white-light diffuser, and
a second planar light mixing element defined by a second response function having a second angular profile with a peak having a second divergence angle, the second planar light mixing element being positioned downstream of the unit input surface so as to at least partially intercept the light crossing the unit input surface and to define a unit emitting surface, the second planar light mixing element comprising a low-angle white-light diffuser,
wherein the first and second planar light mixing elements are spaced apart from each other by at least a minimum unit depth (z1) measured along the direct light direction such that the direct light that exits the first emitting surface of the direct light generator has a uniform luminance.

24. The direct-light generator of claim 23, wherein the minimum unit depth (z1) is given by 5 cm≤z1≤50 cm.

25. The direct-light generator of claim 23, wherein the low-angle white light diffuser is characterized by a response function having an angular profile with a peak having a divergence angle, the low-angle white light diffuser being configured to cause a blurring of the peak in the luminance profile (Lcoll (x, y, θ, φ)) of the collimated light exiting the output surface.

26. The direct-light generator of claim 23, wherein the low-angle white light diffuser of the second planar light mixing element is integrated in a diffused-light generator as a dispersion of transparent microparticles or a superficial random distribution of micro-refractors formed in at least one of a second emitting surface and a diffuser input surface of the diffused-light generator.

27. The direct-light generator of claim 23, wherein the low-angle white-light diffuser of the first planar light mixing element is a micro-optical light mixer comprising a pair of micro-lens arrays, wherein each micro-lens of a first array of the pair of micro-lens arrays is positioned at a focal distance with respect to a respective micro-lens of a second array of the pair of micro-lens arrays so that the micro-lenses of the second array produce in the far field an image of the respective micro-lens of the first array, wherein the micro-optical light mixer is characterized by an acceptance angle ($\alpha\_acc$) and a response function to a collimated light pulse transmitted within an acceptance angle ($\alpha\_acc$) having an angular profile showing a peak with a divergence angle ($\alpha_1'$) measured as full width at half maximum (FWHM) of the peak.

28. The direct-light generator of claim 23, wherein the optical unit additionally comprises a bidimensionally extending channel structure comprising a plurality of side-by-side aligned channels distributed adjacent to each other in a close-packing arrangement.

29. The direct-light generator of claim 23, wherein the optical unit comprises at least one lateral surface extending transversal with respect to the first planar light mixing element and facing toward the inside of the optical unit, wherein each lateral surface is coated or made of a material with a reflectance factor $\eta\_r > 70\%$.

30. The direct-light generator of claim 29, wherein the at least one lateral surface abuts or overlaps the first planar light mixing element or a plane defined by an end of the plurality of side-by-side aligned channels facing the second light mixing element, and extends toward the second light mixing element.

31. The direct-light generator of claim 23, wherein the first divergence angle is measured as a full width at half maximum of the peak of the first angular profile and the second divergence angle is measured as a full width at half maximum of the peak of the second angular profile.

* * * * *